United States Patent
Yamada et al.

(10) Patent No.: US 8,827,809 B2
(45) Date of Patent: Sep. 9, 2014

(54) GAME APPARATUS, STORAGE MEDIUM HAVING GAME PROGRAM STORED THEREIN, GAME SYSTEM, AND GAME PROCESS METHOD

(75) Inventors: Yoichi Yamada, Kyoto (JP); Hidemaro Fujibayashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 334 days.

(21) Appl. No.: 12/852,698

(22) Filed: Aug. 9, 2010

(65) Prior Publication Data

US 2011/0287842 A1   Nov. 24, 2011

(30) Foreign Application Priority Data

May 19, 2010 (JP) ................. 2010-115473

(51) Int. Cl.
*A63F 13/06* (2006.01)
*A63F 13/20* (2014.01)

(52) U.S. Cl.
CPC ......... *A63F 13/06* (2013.01); *A63F 2300/6045* (2013.01); *A63F 2300/6684* (2013.01); *A63F 2300/8029* (2013.01); *A63F 2300/105* (2013.01)
USPC .......................................... 463/39; 345/158

(58) Field of Classification Search
CPC . A63F 13/06; A63F 13/10; A63F 2300/6045; A63F 2300/1031; A63F 2300/105; G06F 3/03; G06F 3/033; G06F 3/0383; G06F 3/0346

USPC ................. 463/36–39, 43; 345/157, 158, 161
See application file for complete search history.

(56) References Cited

U.S. PATENT DOCUMENTS

| | | | |
|---|---|---|---|
| 6,491,585 B1 * | 12/2002 | Miyamoto et al. | 463/33 |
| 2007/0060383 A1 | 3/2007 | Dohta | |
| 2007/0266181 A1 | 11/2007 | Watanabe | |
| 2009/0203445 A1 | 8/2009 | Dohta et al. | |
| 2009/0258706 A1 * | 10/2009 | Rofougaran et al. | 463/39 |
| 2009/0325703 A1 * | 12/2009 | Suzuki et al. | 463/37 |
| 2010/0009754 A1 | 1/2010 | Shimamura et al. | |
| 2010/0225582 A1 * | 9/2010 | Ohta et al. | 345/158 |
| 2010/0225583 A1 * | 9/2010 | Ohta | 345/158 |

FOREIGN PATENT DOCUMENTS

| | | |
|---|---|---|
| JP | 2007-075353 | 3/2007 |
| JP | 2007-260116 A | 10/2007 |
| JP | 2010-017389 A | 1/2010 |

* cited by examiner

*Primary Examiner* — Damon Pierce
(74) *Attorney, Agent, or Firm* — Nixon & Vanderhye, P.C.

(57) ABSTRACT

A game apparatus acquires operation data from an input device at least including a gyroscope, wherein the operation data at least contains angular rate data from the gyroscope. The game apparatus sets a predetermined reference position in a predetermined plane when a player inputs a predetermined instruction, and then calculates a coordinate point based on the angular rate data, wherein the coordinate point represents a position in the predetermined plane relative to the reference position. A game process is performed based on the coordinate point.

25 Claims, 19 Drawing Sheets

Fig. 9

| | INPUT DEVICE ORIENTATION | COORDINATE | SWORD DIRECTION |
|---|---|---|---|
| INITIAL STATE | | | |
| DURING OPERATION | | | |
| RESET STATE | | | |

GAME APPARATUS, STORAGE MEDIUM HAVING GAME PROGRAM STORED THEREIN, GAME SYSTEM, AND GAME PROCESS METHOD

CROSS REFERENCE TO RELATED APPLICATION

The disclosure of Japanese Patent Application No. 2010-115473, filed May 19, 2010, is incorporated herein by reference.

BACKGROUND OF THE INVENTION

1. Field of the Invention

The present invention relates to game apparatuses, storage media having a game program stored therein, game systems, and game process methods, and more specifically, the invention relates to a game apparatus, a storage medium having a game program stored therein, a game system, and a game process method, in which an angular rate of an input device is used as a game input to perform a game process.

2. Description of the Background Art

Conventionally, there are game apparatuses in which an input device is moved to perform a game operation. For example, Patent Document 1 (Japanese Laid-Open Patent Publication No. 2007-75353) discloses a game system using an optical pointing device. In this game system, the input device has an image pickup means capable of picking up an image of a marker in any given position. The game apparatus acquires an image pickup result (i.e., the position of the marker or suchlike in a pickup image) by the image pickup means as operation data, and performs a game process based on the operation data. The image pickup result varies in accordance with the position and orientation of the input device, and therefore the game system allows the player to perform a game operation moving the input device itself.

The method described in Patent Document 1 uses a result of the image pickup means picking up an image of a marker for a game process, and therefore the player must use the input device such that the pickup means is directed toward the marker (the pickup means is capable of picking up an image of the marker). That is, to perform a game operation, the player always needs to direct the input device toward the marker, and therefore cannot perform the game operation with the input device being directed freely.

SUMMARY OF THE INVENTION

Therefore, an objective of the present invention is to provide a game apparatus, a storage medium having a game program stored therein, a game system, and a game process method, in which the player is allowed to readily perform a game operation with an input device being directed freely.

To solve the aforementioned problem, the present invention employs the following features (1) to (17).

(1) The present invention is directed to a computer-readable storage medium having stored therein a game program to be executed in a computer of a game apparatus. The game program causes the computer to function as an operation data acquisition portion, a reference setting portion, a coordinate calculation portion, and a game process portion. The operation data acquisition portion acquires operation data from an input device at least including a gyroscope, wherein the operation data at least contains angular rate data from the gyroscope. The reference setting portion sets a predetermined reference position in a predetermined plane when a player inputs a predetermined instruction. The coordinate point calculation portion calculates a coordinate point based on the angular rate data, wherein the coordinate point represents a position in the predetermined plane relative to the reference position. The game process portion performs a game process based on the coordinate point.

While the "game apparatus" mentioned above is of a stationary type in an embodiment to be described later, it may be of a hand-held type. For example, the "game apparatus" may have an input device incorporated therein.

While the "predetermined plane" mentioned above is a plane within a virtual space in the embodiment to be described later, this is not restrictive and it may be a plane corresponding to a display screen, for example.

According to the above feature (1), the coordinate point reflects the orientation (reference orientation) of the input device at the time of the input of the predetermined instruction. Since the coordinate point is used as a game input, the player can perform a game operation by changing the orientation of the input device 8 from the reference orientation. Also, according to the above feature (1), the reference position is set when the player inputs a predetermined instruction, and therefore the player can freely set the reference orientation. Accordingly, the player can freely set a reference orientation and perform a game operation to change the orientation of the input device from the reference orientation. Thus, according to the present invention, it is possible to provide a game apparatus allowing the player to readily perform a game operation with an input device being directed freely.

(2) The game process portion may perform as the game process either a process for causing a predetermined object to perform a predetermined action toward a position within a virtual space that corresponds to the coordinate point or a predetermined process on an object in a position within the virtual space.

In (2) above, the process for causing a predetermined object to perform a predetermined action toward a position within a virtual space that corresponds to the coordinate point" may be any process so long as the position is used as a target for some action. For example, as in the embodiment to be described later, an object (arrow) may be moved toward or even to the position.

In addition, the "predetermined process on an object in a position within the virtual space (that corresponds to a coordinate point)" may be any process so long as it is performed on the object in the position regardless of the content thereof. For example, as in the embodiment to be described later, the process may be intended to select an item represented by an icon displayed in the position.

According to the above feature (2), a game process is performed by the player specifying the position that corresponds to the coordinate point. Therefore, the present invention is applicable to an operation which changes a specified position by changing the orientation of the input device 8.

(3) The game process portion may display a predetermined image specifying the position within the virtual space that corresponds to the coordinate point and may perform the game process in response to a first predetermined operation performed on the input device.

According to the above feature (3), a predetermined image is displayed in a position (that corresponds to a coordinate point) specified by the player. Also, a game process is performed in response to a first operation. Thus, the player can perform a game operation to cause a player character or suchlike to perform some action by moving the specified position (predetermined image) while changing the orientation of the input device and thereafter performing the first operation when a desired position is specified.

(4) The reference setting portion may update the reference position when a second predetermined operation is performed on the input device.

According to the above feature (4), the reference position is updated when the second operation is performed, and therefore the player can update the reference position at a desired time. Thus, the player can change the reference orientation of the input device even during an operation to change the orientation of the input device.

(5) The second predetermined operation may be intended to determine an item to be used by a predetermined object. In this case, the game process portion performs as the game process a process for causing the predetermined object to perform an action using the determined item.

According to the above feature (5), the reference position is set in response to the determination of the item to be used by the predetermined object. Accordingly, by orienting the input device so as to be readily operated to determine an item, the player can use such an orientation as the reference orientation to operate the action of the predetermined object using the item. Thus, the player can perform a game operation in a simple manner with the input device being directed freely, without the need to perform an additional operation to set the reference orientation (reference position).

(6) The game program may further cause the computer to function as an item selection portion for selecting an item from among choices for items to be used by the predetermined object in accordance with the orientation of the input device or the coordinate point calculated based on the angular rate data, and determining an item being selected at the time of the second predetermined operation as the item to be used by the predetermined object.

According to the above feature (6), item selection can also be performed by an operation to change the orientation of the input device. Thus, the player can perform both the operation to select an item and the operation to use the selected item by the operation to change the orientation of the input device, and therefore it is possible to provide a player-friendly operation method.

(7) The game program may further cause the computer to function as a camera control portion for controlling a position and/or a direction of a virtual camera based on the coordinate point. In this case, the camera control portion at least stops the virtual camera from moving when the coordinate point represents the reference position.

The phrase "based on the coordinate point" encompasses both cases where the position and/or the direction of the virtual camera is/are directly calculated from the coordinate point and where they are indirectly calculated. For example, as in the embodiment to be described later, the direction of the virtual camera may be calculated from the position of a sight image which is calculated from the coordinate point.

According to the above feature (7), the game screen can be moved (scrolled) by an operation to change the orientation of the input device. Particularly, in the case where the above feature (7) is used in combination with the above feature (2) or (3), the player can simultaneously perform both the operation to move the specified position and the operation to scroll the game screen, which renders the operation to move the specified position more user-friendly. Also, according to the above feature (7), the game screen is not scrolled when the coordinate point is in the reference position, and therefore it is possible to provide a player-friendly operation method in which the game screen is prevented from being abruptly scrolled when the reference is set.

Furthermore, in the case where the above feature (7) is used in combination with the above feature (4), the second operation is performed so that the coordinate point is set as the reference position, and therefore the game screen is stopped from being scrolled. Here, the player can also stop the scrolling by an operation to return the input device to the reference orientation, but in the present invention, the reference orientation is not fixed, and therefore in some cases, it might be difficult to quickly perform such an operation. On the other hand, in the case where the above feature (7) is used in combination with the above feature (4), the player can quickly stop the scrolling by the second operation, which enhances operability of the game.

(8) The camera control portion may move the virtual camera in accordance with a degree of distance from the coordinate point to the reference position.

According to the above feature (8), the game screen can be scrolled in accordance with the degree of tilting the input device from the reference orientation, and therefore the game screen can be scrolled with an intuitive operation.

(9) The game program may further cause the computer to function as a camera control portion for controlling a position and/or a direction of a virtual camera such that the virtual camera is directed toward a predetermined target within a virtual space when a third predetermined operation is performed on the input device. In this case, the reference setting portion updates the reference position when the third predetermined operation is performed.

The phrase "the virtual camera is directed toward a predetermined target" encompasses not only the case where the sight line of the virtual camera intersects the predetermined target but also the case where the position and the direction of the virtual camera are changed such that at least the predetermined target is displayed.

According to the above feature (9), when the third operation is performed, the position and/or the direction of the virtual camera is/are changed such that the predetermined target is displayed. Accordingly, the player can render the predetermined target readily viewable by the third operation.

Here, when the third operation is performed, the viewpoint position and/or the sight-line direction of the game screen is/are changed, and therefore if the coordinate reference position does not change at all, the player might perceive the operation to be unnatural. For example, in the case where the direction of an object within a game space is controlled in accordance with a coordinate point, as in the feature (10) below and the embodiment to be described later, when the viewpoint position and/or the sight-line direction change(s), the direction of the object being displayed changes as well, and therefore the player might perceive the operation to be unnatural. Also, in the case where a cursor on the screen is controlled in accordance with a coordinate point, when the viewpoint position and/or the sight-line direction change (s), the position pointed at by the cursor changes as well. On the other hand, according to the above feature (9), when the third operation is performed, the reference position is set again (reset), which allows the player to perceive the operation to be less unnatural.

(10) The game process portion may perform as the game process a process for controlling an action of an object to be operated by the player so that the direction of the action is changed in accordance with the coordinate point.

The "object to be operated by the player" may be a player character or a body part of the player character, or it may be an item held by the player character, such as a sword object as in the embodiment to be described later.

According to the above feature (10), the direction of an object within a virtual space can be controlled by the operation to change the orientation of the input device. As a result, the direction in the virtual space changes in accordance with the direction of the input device, and therefore it is possible to provide an intuitive, user-friendly operation method.

(11) The game process portion may start controlling the action of the object to be operated by the player in response to an input of the predetermined instruction.

According to the above feature (11), by inputting a predetermined instruction, a reference position is set and an operation of an object to be operated is started. Accordingly, by orienting the input device so as to be readily operated at the start of the operation, the player can use such an orientation as the reference orientation to perform the operation. Thus, the player can perform the operation in a simple manner with the input device being directed freely, without the need to perform an additional operation to set the reference orientation (reference position).

(12) The coordinate calculation portion may calculate the coordinate point so as to change in accordance with an angular rate indicated by the angular rate data.

According to the above feature (12), the coordinate point is calculated so as to reflect a change of the orientation of the input device, and therefore it is possible to readily calculate a coordinate point corresponding to the orientation of the input device.

(13) The game program may further cause the computer to function as an orientation calculation portion for calculating the orientation of the input device based on the angular rate data. In this case, the coordinate calculation portion calculates the coordinate point based on the orientation of the input device.

According to the above feature (13), the game apparatus calculates the orientation of the input device and also calculates the coordinate point based on the calculated orientation, and therefore it is possible to readily calculate a coordinate point corresponding to the orientation of the input device.

(14) The coordinate calculation portion may calculate a coordinate point representing a position at an intersection between a point in the predetermined plane and a line segment continuing from the predetermined reference point to a direction of a vector indicating the orientation of the input device.

According to the above feature (14), it is possible to readily calculate a coordinate point representing a position (in a plane) that changes in accordance with the orientation of the input device.

(15) The input device may further include an acceleration sensor. In this case, the orientation calculation portion calculates the orientation of the input device based on the angular rate data and corrects the orientation based on an acceleration detected by the acceleration sensor.

According to the above feature (15), the orientation of the input device based on the angular rate is corrected using the acceleration, thereby making it possible to calculate the orientation with enhanced accuracy.

(16) The input device may further include an image pickup portion. In this case, the orientation calculation portion calculates the orientation of the input device based on the angular rate data and corrects the orientation at least for rotation about a direction of gravity based on a position of a predetermined target within an image taken by the image pickup portion.

According to the above feature (16), the orientation of the input device based on the angular rate is corrected using information of an image taken by the pickup portion, thereby making it possible to calculate the orientation with enhanced accuracy.

(17) The present invention may also be directed to a computer-readable storage medium having stored therein a game program, as described below, which is executed in a computer of a game apparatus. Specifically, the game program causes the computer to function as an operation data acquisition portion, a reference calculation portion, an orientation calculation portion, and a game process portion. The operation data acquisition portion acquires operation data from an input device at least including a gyroscope, wherein the operation data at least contains angular rate data from the gyroscope. The reference calculation portion calculates a reference orientation of the input device based on angular rate data acquired upon input of a predetermined instruction by a player. The orientation calculation portion calculates an orientation of the input device based on angular rate data acquired after the input of the instruction. The game process portion performs a game process based on a tilt of the orientation calculated by the orientation calculation with respect to the reference orientation.

The "tilt of the orientation calculated by the orientation calculation portion with respect to the reference orientation" refers to a change from the reference orientation to the orientation calculated by the orientation calculation portion. Accordingly, the "game process portion" performs a game process based on the amount and/or the direction of the change.

According to the above feature (17), the player can perform a game operation by changing the orientation of the input device 8 from the reference orientation. Also, according to the above feature (17), the reference orientation is set when the player inputs a predetermined instruction, and therefore the player can freely set the reference orientation. Accordingly, the player can freely set a reference orientation and perform a game operation to change the orientation of the input device from the reference orientation. Thus, according to the present invention, it is possible to provide a game apparatus allowing the player to readily perform a game operation with an input device being directed freely.

Also, the present invention may be embodied in the form of a game apparatus including portions equivalent to the portions described in (1) through (17) above. Furthermore, the present invention may be embodied in the form of a game system consisting of one or more information processing apparatuses which include the above-described portions. In this case, the one or more information processing apparatuses may perform direct wire or wireless communication or may perform network communication. Moreover, the present invention may be embodied in the form of a game process method to be performed through the above-described portions.

According to the present invention, a coordinate point that indicates a position corresponding to an orientation of an input device is calculated based on a reference position freely set by the player, and the calculated coordinate point is used as a game input. Accordingly, the player can freely set a reference orientation and perform a game operation to change the orientation of the input device from the reference orientation. Thus, the player can readily perform a game operation with the input device being directed freely.

These and other objects, features, aspects and advantages of the present invention will become more apparent from the

BRIEF DESCRIPTION OF THE DRAWINGS

FIG. 9 is a table illustrating the relationship between the orientation of the input device and the direction of the sword.

DESCRIPTION OF THE PREFERRED EMBODIMENTS

Entire Structure of Game System

Figure 1:
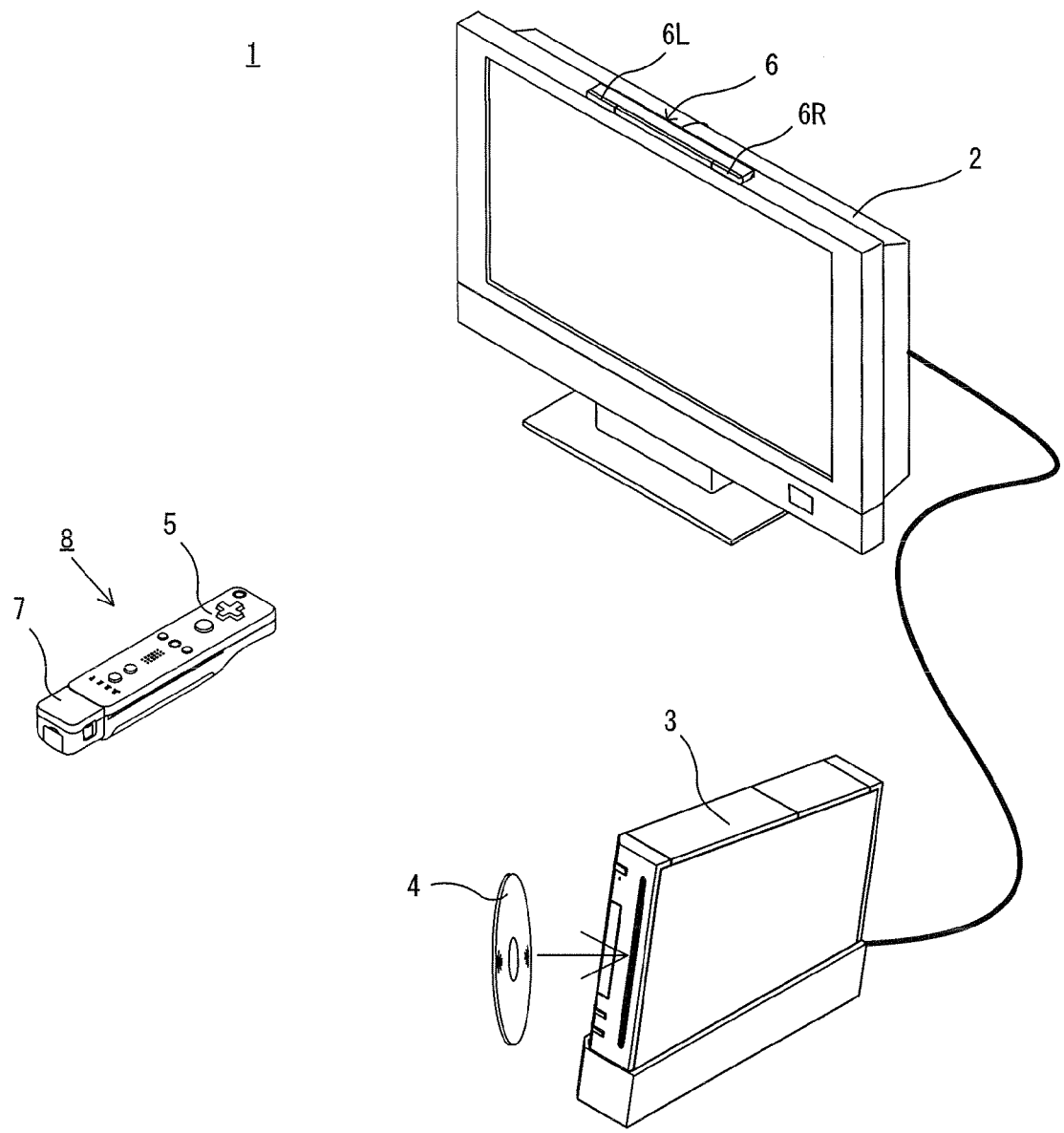
FIG. 1 is an external view of a game system.

With reference to FIG. 1, a game system including a game apparatus according to an embodiment of the present invention will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs a game process based on a game operation using the input device 8.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The input device 8 provides the game apparatus 3 with operation data representing the content of an operation performed on the input device 8 itself. In the present embodiment, the input device 8 includes a controller 5 and a gyroscope unit 7. As described in detail below, the input device 8 is structured such that the gyroscope unit 7 is detachably connected to the controller 5. Radio communication is made between the controller 5 and the game apparatus 3. In the present embodiment, the radio communication between the controller 5 and the game apparatus 3 is made using, for example, the Bluetooth® technology. In another embodiment, the connection between the controller 5 and the game apparatus 3 may be a wired connection.

[Internal Structure of Game Apparatus 3]

Figure 2:
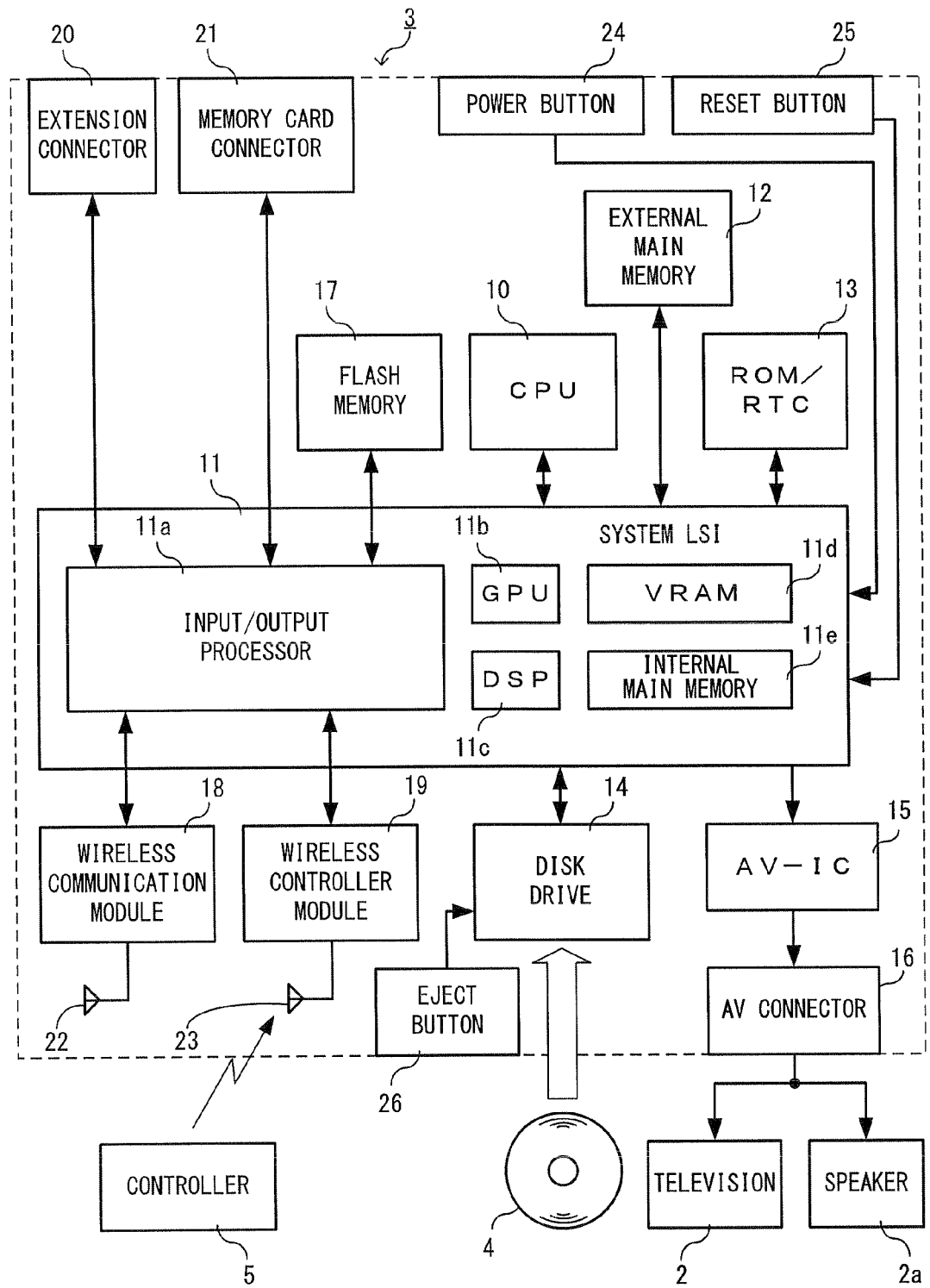
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots program of the game apparatus 3. The eject button 26 is connected to the disk drive 14. When the eject button 26 is pressed, the optical disc 4 is ejected from the disk drive 14.

[Structure of Input Device 8]

Figure 3:
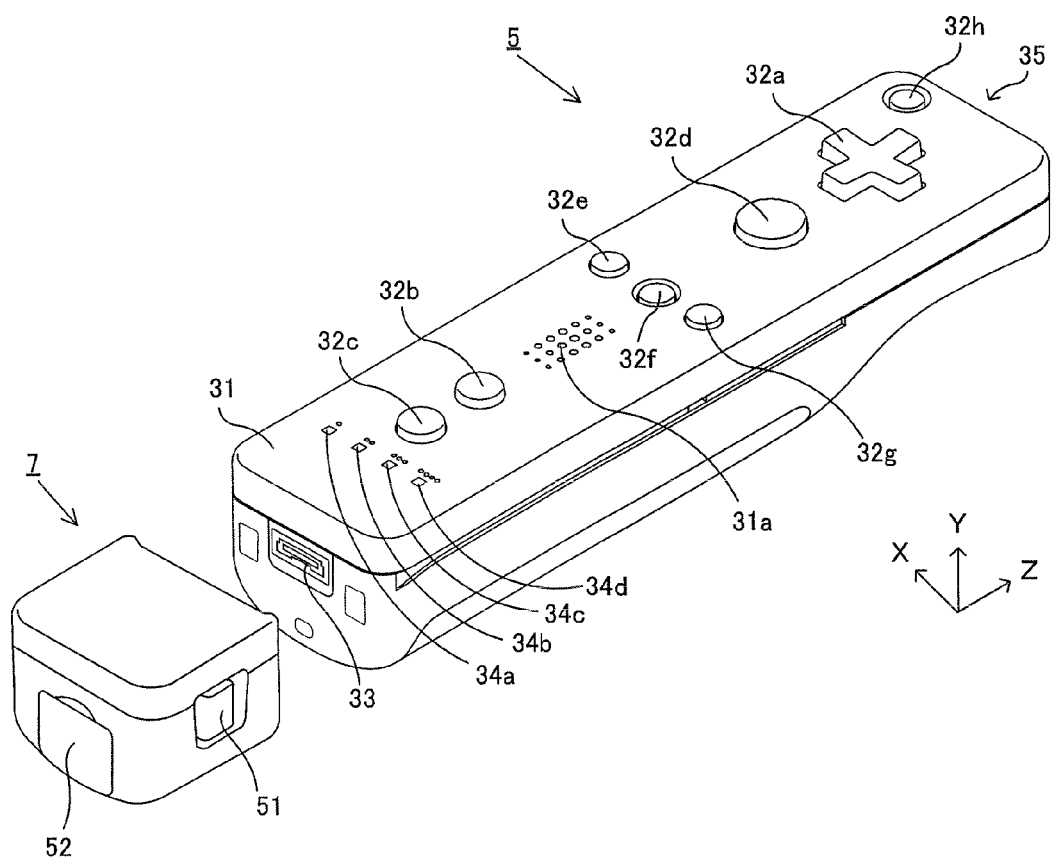
FIG. 3 is a perspective view illustrating an external structure of an input device.
Figure 4:
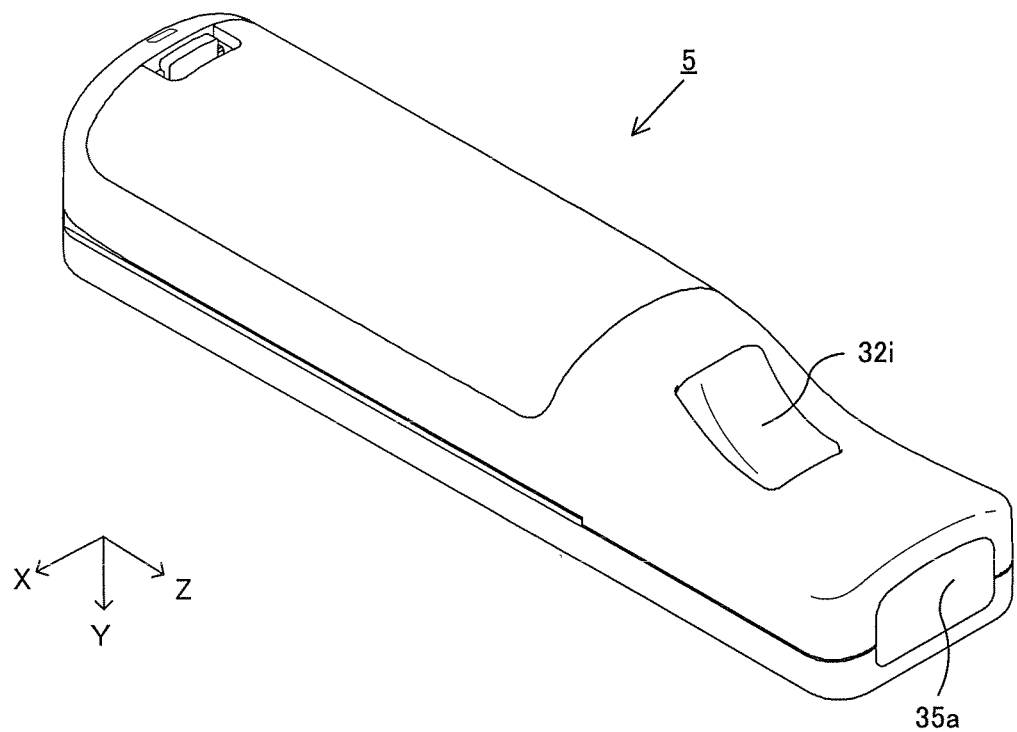
FIG. 4 is a perspective view illustrating an external structure of a controller.

Next, with reference to FIGS. 3 to 6, the input device 8 will be described. FIG. 3 is a perspective view illustrating an external structure of the input device 8. FIG. 4 is a perspective view illustrating an external structure of the controller 5. The perspective view of FIG. 3 shows the controller 5 as viewed from the top rear side thereof, and the perspective view of FIG. 4 *shows* the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 7 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
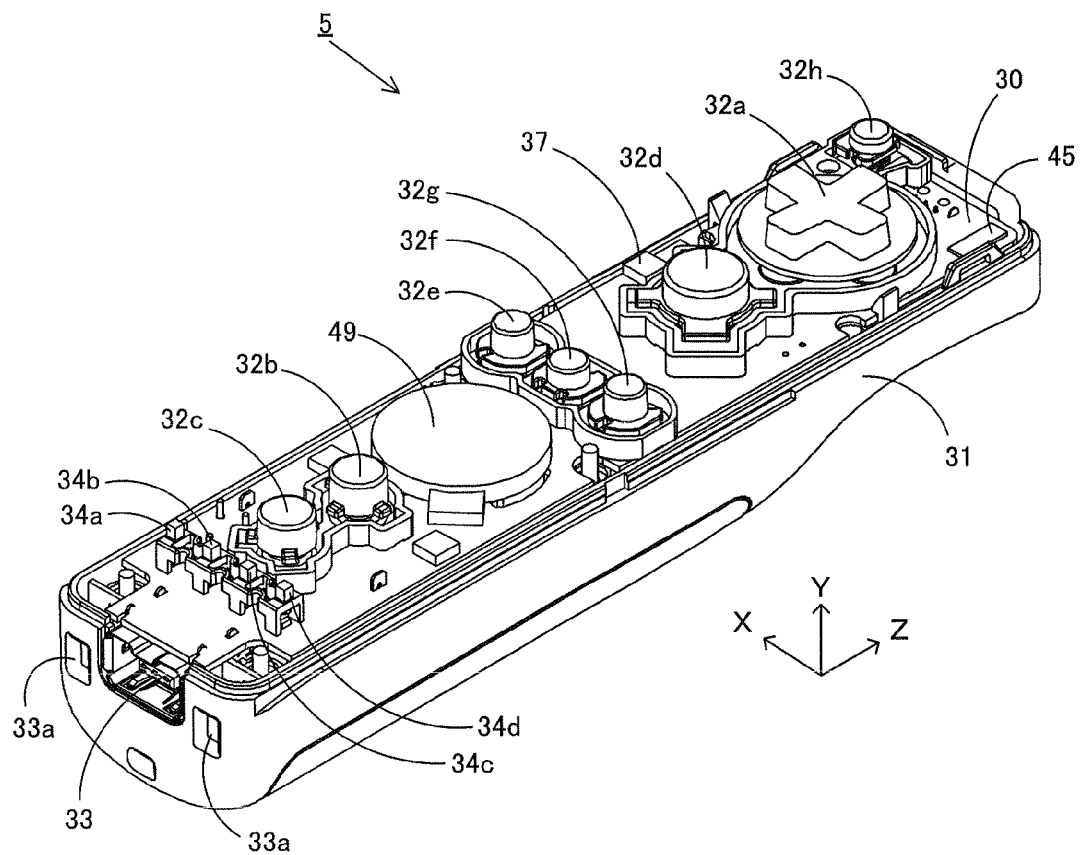
FIG. 5 is a diagram illustrating an internal structure of the controller.
Figure 6:
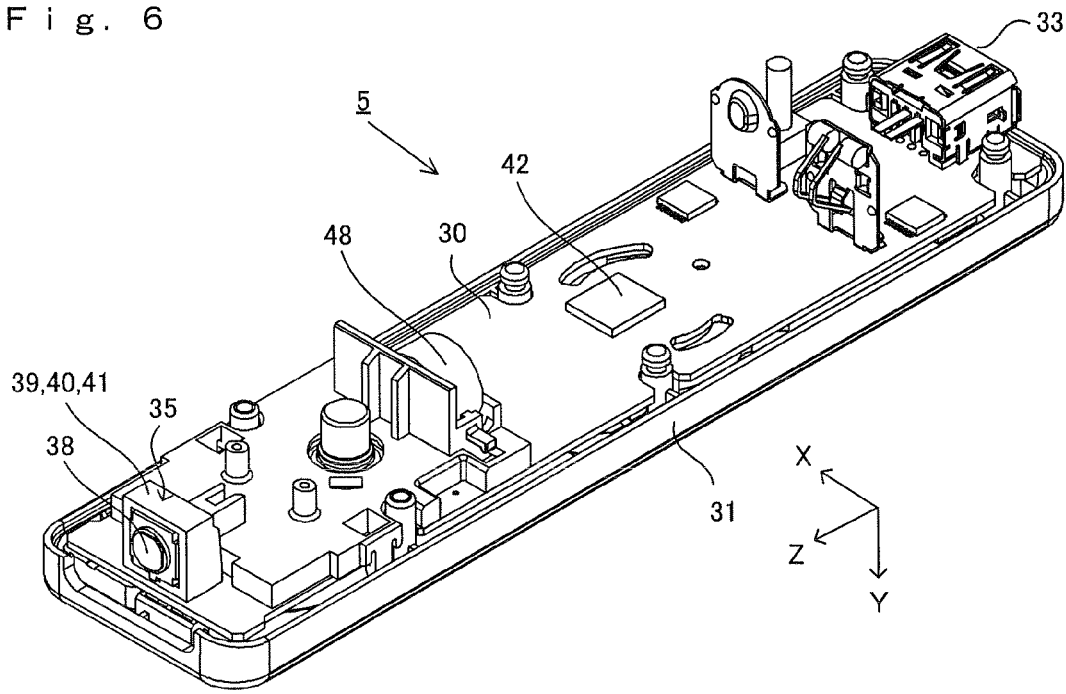
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 7 includes gyroscopes (gyroscopes 55 and 56 shown in FIG. 7) for detecting angular rates around three axes, respectively. The gyroscope unit 7 is detachably attached to the connector 33 of the controller 5. The gyroscope unit 7 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 7 is attached to the controller 5, the plug 53 is connected to the connector 33, and the hooks engage with the fastening holes 33a, respectively, of the controller 5. Therefore, the controller 5 and the gyroscope unit 7 are securely fixed to each other. Further, the gyroscope unit 7 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 7 can be disconnected from the controller 5.

Further, a connector having the same shape as the connector 33 is provided at the rear edge of the gyroscope unit 7. Therefore, another device which can be attached to (the connector 33 of) the controller 5 can be attached as well to the connector of the gyroscope unit 7. In FIG. 3, a cover 52 is detachably provided over the connector.

FIGS. 3 to 6 show only examples of the shape of the controller 5 and the gyroscope unit 7, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
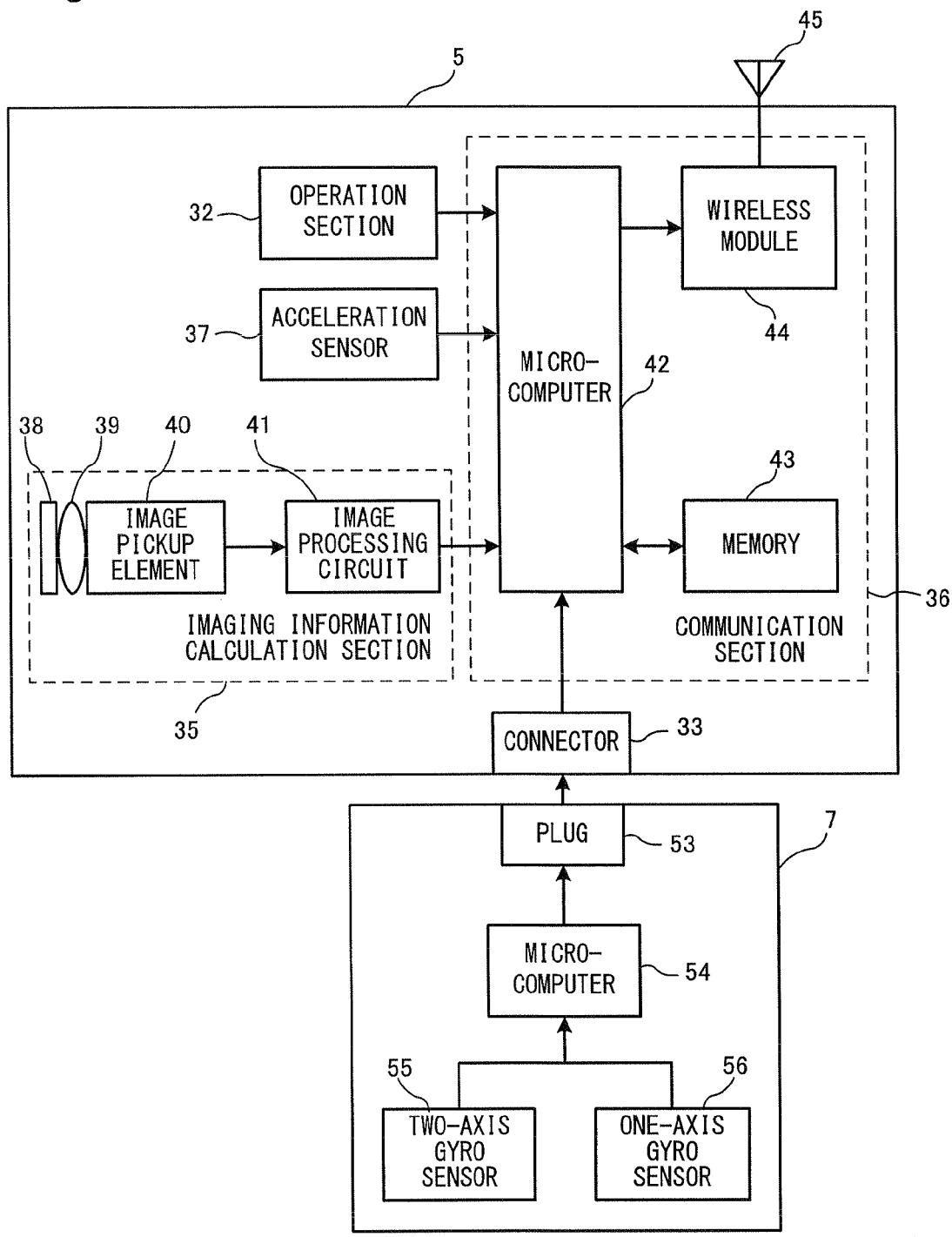
FIG. 7 is a block diagram illustrating a structure of the input device.

FIG. 7 is a block diagram illustrating a structure of the input device 8 (the controller 5 and the gyroscope unit 7). The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40.

The image pickup element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax,ay,az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acceleration data. In the present embodiment, the game apparatus 3 determines the orientation of the controller 5 based on the acceleration data.

Data (acceleration data) representing the acceleration (acceleration vector) detected by the acceleration sensor 37 is outputted to the communication section 36. In the present embodiment, the acceleration sensor 37 is used as a sensor for outputting data for use in determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 7 is inputted to the microcomputer 42 through the connector 33. Hereinafter, a structure of the gyroscope unit 7 will be described.

The gyroscope unit 7 includes the plug 53, a microcomputer 54, the two-axis gyroscope 55, and the one-axis gyroscope 56. As described above, the gyroscope unit 7 detects angular rates around three axes (X-, Y-, and Z-axes in the present embodiment), respectively, and transmits data (angular rate data) representing the detected angular rates, to the controller 5.

The two-axis gyroscope 55 detects an angular rate (per unit time) around each of the X-axis and the Z-axis. Further, the one-axis gyroscope 56 detects an angular rate (per unit time) around the Y-axis. In the present invention, the directions of rotation around the X-axis, the Y-axis, and the Z-axis relative to the imaging direction (the Z-axis positive direction) of the controller 5 are referred to as a pitch direction, a yaw direction, and a roll direction, respectively. That is, the two-axis gyroscope 55 detects angular rates in the pitch direction (the direction of rotation around the X-axis) and the roll direction (the direction of rotation around the Z-axis), and the one-axis gyroscope 56 detects an angular rate in the yaw direction (the direction of rotation around the Y-axis).

In the present embodiment, the two-axis gyroscope 55 and the one-axis gyroscope 56 are used to detect the angular rates around the three axes. However, in another embodiment, the number of gyroscopes and a combination thereof to be used may be optionally selected, provided that the angular rates around the three axes can be detected.

Further, in the present embodiment, the three axes around which the gyroscopes 55 and 56 detect the angular rates are set to correspond to three axes (X-, Y-, and Z-axes), respectively, for which the acceleration sensor 37 detects accelerations, such that calculation in the orientation calculation process described below is facilitated. However, in another embodiment, the three axes around which the gyroscopes 55 and 56 detect the angular rates may not necessarily correspond to the three axes for which the acceleration sensor 37 detects accelerations.

Data representing the angular rates detected by the gyroscopes 55 and 56 are outputted to the microcomputer 54. That is, data representing the angular rates around the three axes, i.e., the X-, Y-, and Z-axes, are inputted to the microcomputer 54. The microcomputer 54 transmits the data representing the angular rates around the three axes, as angular rate data, to the controller 5 through the plug 53. The transmission from the microcomputer 54 to the controller 5 is sequentially performed at a predetermined cycle, and the game is typically processed at a cycle of $1/60$ seconds (corresponding to one frame time), and the transmission is preferably performed at a cycle shorter than a cycle of $1/60$ seconds.

The controller 5 will be described again. Data outputted from the operation section 32, the imaging information calculation section 35, and the acceleration sensor 37 to the microcomputer 42, and data transmitted from the gyroscope unit 7 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth® technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of $1/60$ sec. (corresponding to one frame time), data is preferably transmitted at a cycle of a shorter time period. The communication section 36 of the controller 5 outputs, to the wireless controller module 19 of the game apparatus 3, the respective operation data at intervals of $1/200$ seconds, for example.

When the input device 8 is used, the player can perform not only a conventionally typical game operation of pressing the respective operation buttons, but also an operation of tilting the input device 8 at a desired angle of tilt. Other than these operations, the player can perform an operation of designating a desired position on a screen using the input device 8, or perform an operation of moving the input device 8 itself.

Note that the present embodiment will be described taking as an example the input device 8 provided with the gyroscopes 55 and 56, the acceleration sensor 37, and the image pickup element 40 as features for detecting the orientation and movement of the input device 8. However, in another embodiment, the input device 8 may include at least the gyroscopes, and does not have to include both the acceleration sensor 37 and the image pickup element 40. Also, in the present embodiment, the input device 8 includes the controller 5 and the gyroscope unit 7 detachable from the controller 5, but in another embodiment, the gyroscopes are included in the input device. For example, the controller 5 may include the gyroscopes 55 and 56.

[Outline of the Game Process]

Next, a game process performed by the game apparatus 3 will be outlined with reference to FIGS. 8 to 12. In the present embodiment, a game in which a player character is operated within a virtual space through an operation of moving the input device 8 itself is described as an exemplary game played in accordance with a game operation. In this game, the player causes the player character to perform an action of using an item (weapon) such as a sword or a bow and arrow.

Also, in the present embodiment, a two-dimensional coordinate point, which is calculated based on angular rates detected by the gyroscopes 55 and 56, is used as a game input. The two-dimensional coordinate point represents a position corresponding to an orientation of the input device 8 within the predetermined virtual plane (see FIG. 15). Although a method for calculating the two-dimensional coordinate point will be described in detail, the two-dimensional coordinate point is calculated such that a coordinate value changes in accordance with the direction and amount of the change in orientation from an orientation (reference orientation) of the input device 8 at a predetermined time, with a reference position (the origin (0,0)) being a position that corresponds to the reference orientation. For example, when the input device 8 changes its orientation from the reference orientation rightward (or leftward), the x-component of the two-dimensional coordinate point increases (or decreases), and when the input device 8 changes its orientation from the reference orientation upward (or downward), the y-component of the two-dimensional coordinate point increases (or decreases). In this manner, in the present embodiment, the two-dimensional coordinate point is calculated using the angular rates detected by the gyroscopes 55 and 56. Accordingly, the two-dimensional coordinate point can be calculated whatever the orientation of the input device 8 (i.e., even when the image pickup element 40 is not directed to the marker portion 6).

Figure 8:
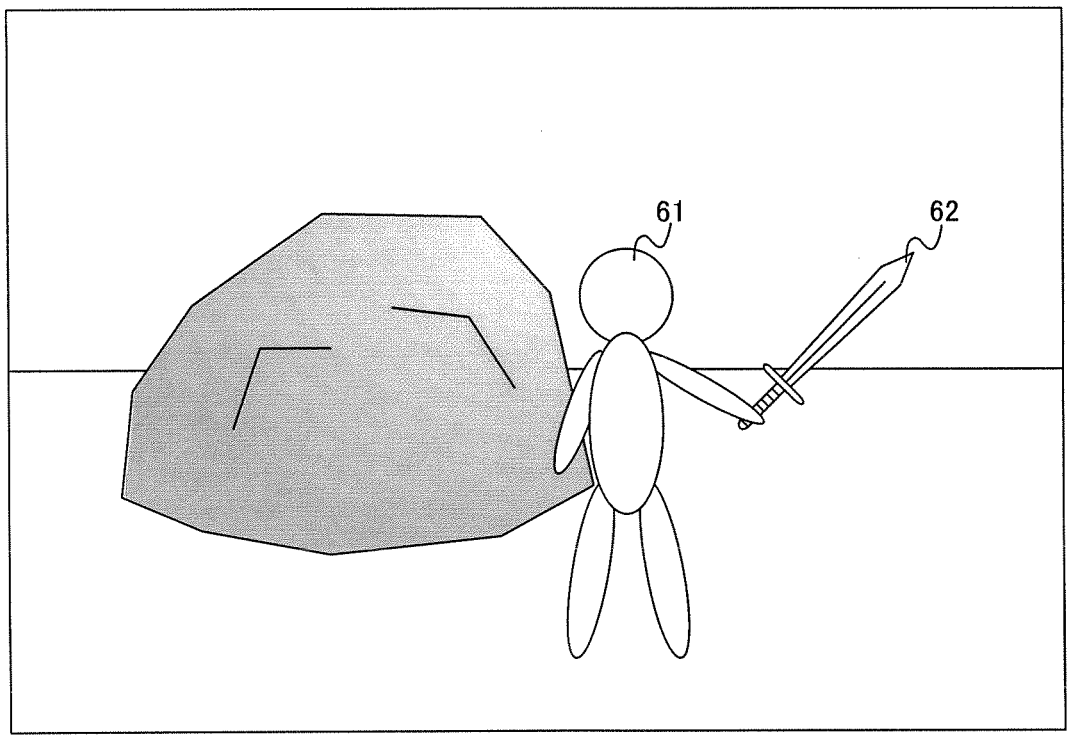
FIG. 8 is a diagram illustrating an exemplary game image where a player character uses a sword.

FIG. 8 is a diagram illustrating an exemplary game image where a player character uses a sword. In the game image shown in FIG. 8, a player character 61 holds a sword 62. When the player character 61 putting the sword 62 on performs a predetermined sword pulling action, the player character 61 pulls the sword 62. The direction of the sword 62 is determined based on the two-dimensional coordinate point so as to change in accordance with the orientation of the input device 8. That is, the player character 61 performs an action of changing the holding direction of the sword 62 in accordance with the direction of the input device 8.

FIG. 9 is a table illustrating the relationship between the orientation of the input device 8 and the direction of the sword 62. As shown in FIG. 9, the two-dimensional coordinate point within the virtual plane is calculated so as to correspond to the reference position (origin) at the time of starting the operation of the sword 62 (at the time of pulling the sword 62). As a result, the orientation of the input device 8 at the start is set as the reference orientation. Also, when the two-dimensional coordinate point is in the reference position, the sword 62 is controlled to be directed forward from the player character 61. Therefore, at the start, the sword 62 is directed forward from the player character 61 (see the right upper column of the table shown in FIG. 9).

In an operation after the sword 62 has been pulled, the game apparatus 3 calculates a two-dimensional coordinate point in accordance with the direction and amount of the orientational change from the reference orientation. Then, the direction of the sword 62 is controlled based on the two-dimensional coordinate point. For example, when the input device 8 is directed from the reference orientation rightward as shown in the middle row of the table in FIG. 9, the two-dimensional coordinate point takes a positive x-component value, and the sword 62 changes its direction at the start rightward. While FIG. 9 only shows the case where the input device 8 changes its orientation from the reference orientation rightward/leftward, the two-dimensional coordinate point changes as well when the orientation changes upward/downward. Specifically, when the orientation changes upward/downward, the y-component of the two-dimensional coordinate point changes.

As described above, in the present embodiment, the reference position is set within the virtual plane at the start of operating the sword 62, and the two-dimensional coordinate point is calculated in accordance with an orientational change of the input device 8 from the start. Then, the direction of the sword 62 is controlled based on the two-dimensional coordinate point. That is, the game apparatus 3 sets the orientation of the input device 8 at the start as the reference orientation, and controls the direction of the sword 62 in accordance with the orientational change from the reference orientation. As a result, the orientation at the start is referenced whatever the orientation the player places the input device 8 in at the start of operating the sword 62, and therefore the player can perform a game operation while freely directing the input device 8.

Here, for example, a method is conceivable in which an orientation of the input device 8 pointed in a specific direction (e.g., an orientation pointing at the marker portion 6) is set as the reference orientation. However, in such a method, to point the sword 62 in a specific direction (e.g., forward direction), the player needs to point the input device in that specific direction. This allows calculation of an arbitrary orientation of the input device 8 based on the angular rate data but does not allow the game operation to be performed freely pointing the input device 8. On the other hand, according to the present embodiment, the player can freely set the orientation of the input device 8 to direct the sword 62 forward, and therefore can perform game operation freely directing the input device 8. For example, the player can direct the sword 62 forward when the input device 8 is oriented in both the direction toward the television 2 and the direction opposite to the television 2.

Also, in the present embodiment, when a predetermined operation is performed while operating the sword 62, the two-dimensional coordinate reference position is set again. Specifically, the two-dimensional coordinate point at the time of the predetermined operation is set as the reference position, and therefore the sword 62 is directed forward at the same time (see the bottom row of the table in FIG. 9). In this manner, in the present embodiment, the player can reset the reference position while operating the sword 62. Accordingly, the player can readily reset the reference position without the need to perform an operation of pulling the sword 62 again after sheathing it. In the present embodiment, the predetermined operation is an operation (operation of interest) to direct both the virtual camera and the player character 61 to a predetermined target, as will be described in detail later. By setting the reference position again in accordance with the operation of interest, game operability can be further improved.

Figure 10:
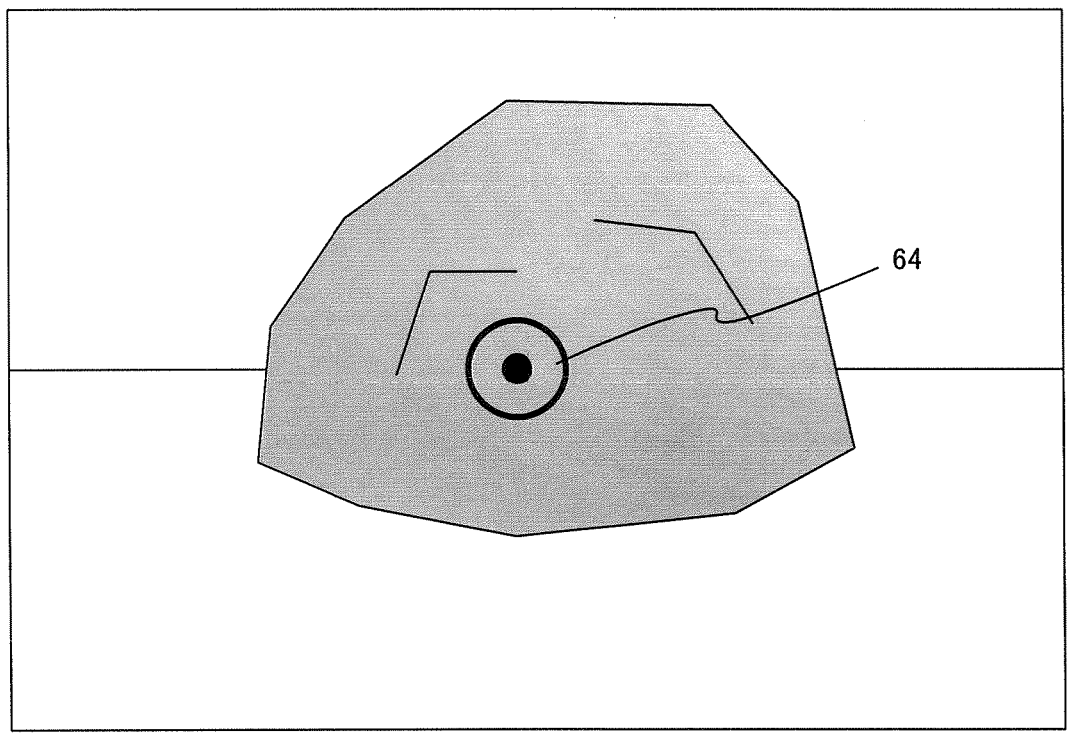
FIG. 10 is a diagram illustrating an exemplary game image where the player character uses a bow and arrow.

Described next is the case where the player character 61 uses a bow and arrow. FIG. 10 is a diagram illustrating an exemplary game image where the player character 61 uses a bow and arrow. Here, the player character 61 can use a plurality of items in addition to a bow and arrow, and when the player selects a desired item on an item selection screen (to be described later), a game image for the item selected for use is displayed. Concretely, when the player performs an operation of selecting a bow and arrow on the item selection screen, the game image shown in FIG. 10 is displayed. When a bow and arrow is used, a virtual space image as viewed by the player character 61 is displayed along with an image (sight image) 64 representing a sight, as shown in FIG. 10. The sight image 64 indicates the direction in which the arrow is shot. When the sight image 64 is displayed, the player character 61 shoots an arrow in the direction indicated by the sight image 64 in response to the player performing a predetermined shooting operation.

In the case where a bow and arrow is used, the game apparatus 3 controls the position of the sight image 64 (arrow shooting direction) based on the two-dimensional coordinate point. The position of the sight image 64 on the display screen is calculated so as to be located at the center of the screen when the two-dimensional coordinate point is the reference position, with the values of the x- and y-axis components of the two-dimensional coordinate point respectively corresponding to horizontal and vertical positions on the screen.

Accordingly, in the case of the bow and arrow, as in the case of the sword 62, the orientation of the input device 8 at the start of operating the bow and arrow is set as the reference orientation, and the position of the sight image 64 can be controlled in accordance with an orientational change from the reference orientation. Thus, the player can perform a game operation freely directing the input device 8.

Figure 11:
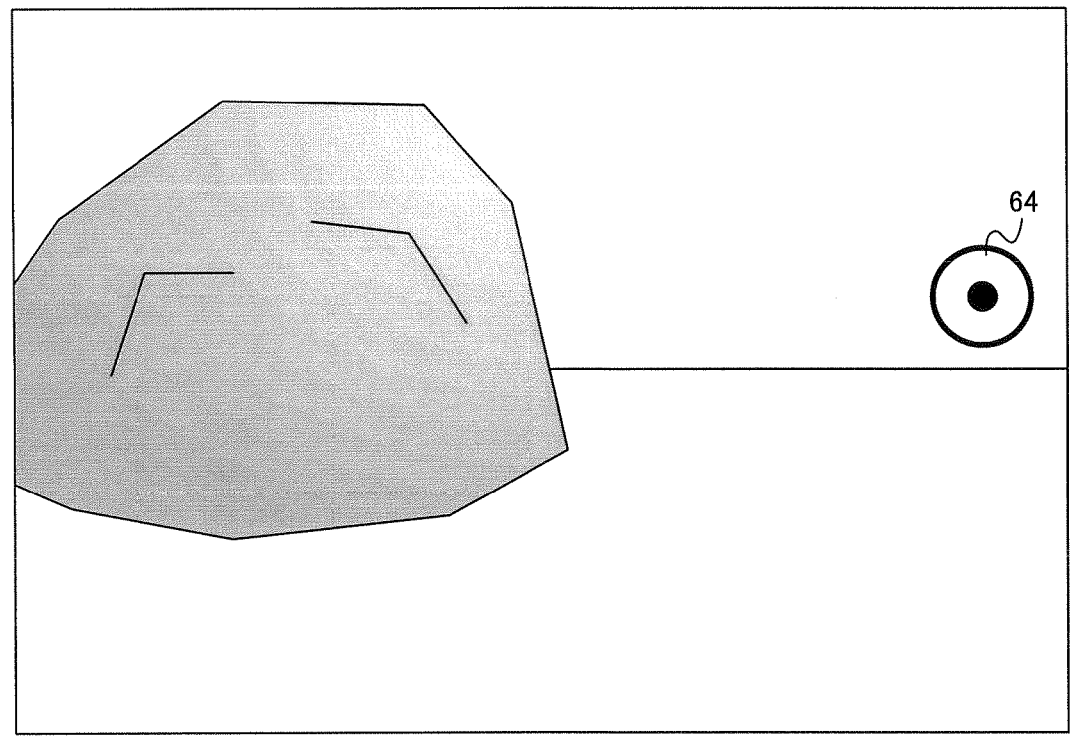
FIG. 11 is a diagram illustrating a game image where a display target area has changed from that of the game image shown in FIG. 10.

Here, when the sight image 64 is positioned close to the boundary of the display area of the television 2, the game apparatus 3 changes the direction of the virtual camera. As a result, the displayed area (display target area) of the virtual space changes. FIG. 11 is a diagram illustrating a game image where the display target area has changed from that of the game image shown in FIG. 10. For example, when the sight image 64 is positioned close to the right end of the display area, the virtual camera changes its direction by turning to the right. As a result, the display target area is scrolled to the right as shown in FIG. 11. In this manner, by changing the display target area in accordance with the position of the sight image 64, the sight image 64 can be freely directed, resulting in improved operability of the sight image 64.

Figure 12:
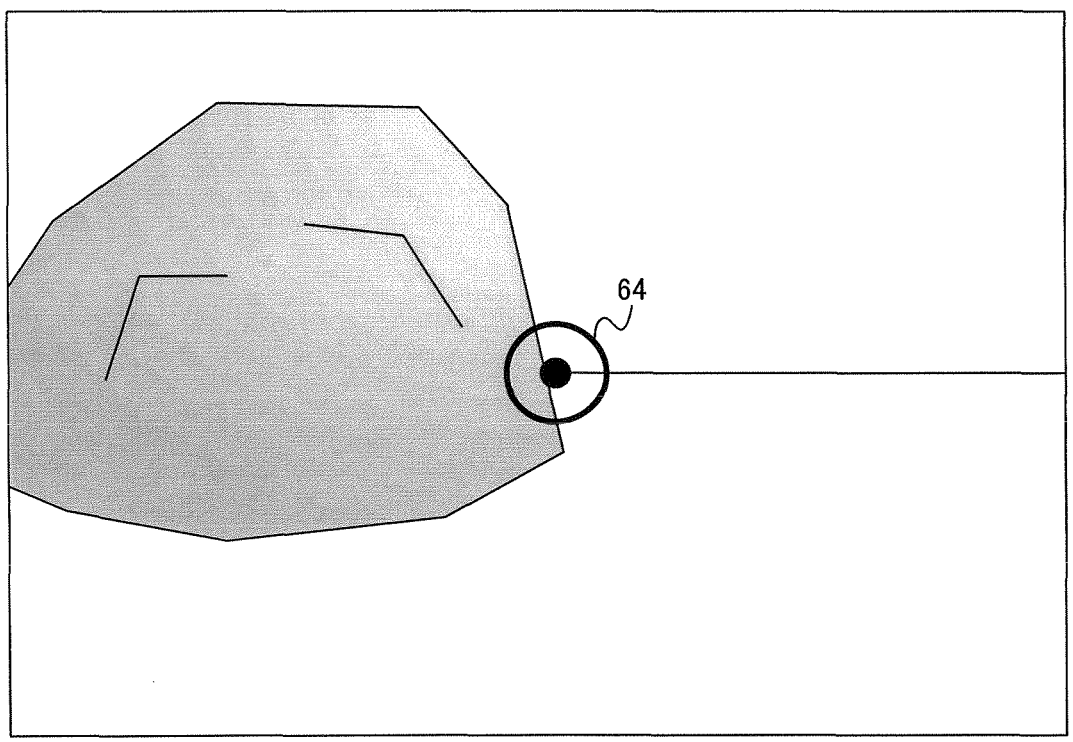
FIG. 12 is a diagram illustrating a game image where a reference position has been set again changing from the game image shown in FIG. 11.

Also, when the bow and arrow is operated, as in the case of the sword 62, the player can set the reference position for the two-dimensional coordinate point again. Specifically, in the case where the bow and arrow is operated, when a predetermined reset operation is performed on the input device 8, the game apparatus 3 sets the two-dimensional coordinate reference position again. The two-dimensional coordinate point at the time of the reset operation is set as the reference position, and therefore the sight image 64 is positioned at the center of the screen at the same time. FIG. 12 is a diagram illustrating a game image where the reference position has been set again changing from the game image shown in FIG. 11. In the case where the sight image 64 is positioned close to the edge of the screen as shown in FIG. 11, when the reset operation is performed with the display target area being scrolled, the sight image 64 is positioned at the center of the screen, as shown in FIG. 12. The scrolling is stopped by positioning the sight image 64 at the center of the screen.

In the present embodiment, the game apparatus 3 controls the position of the sight image 64 by the two-dimensional coordinate point, and also controls the virtual camera by the position of the sight image 64. Accordingly, when the reset operation is performed, the virtual camera also stops moving. Therefore, the player can stop scrolling the screen by simply performing the reset operation. Here, the virtual camera can also be stopped from moving by returning the sight image 64 to the center of the screen (returning the input device 8 to the reference orientation). However, in the present embodiment, the reference orientation of the input device 8 is freely set and is not fixed, and therefore it is not an easy operation for the player to return the input device 8 to the reference orientation. Therefore, in the present embodiment, the virtual camera is stopped from moving by the reset operation, so that the player can readily stop the scrolling. Specifically, according to the present embodiment, the player can readily scroll the screen by adjusting the position of the sight image 64 and also can readily stop the scrolling by the reset operation. Thus, operability of the game operation with the sight image 64 can be improved. While any method can be employed to control the virtual camera based on the position of the sight image 64, it is at least preferable that the virtual camera not be moved when the two-dimensional coordinate point represents the reference position.

[Details of the Game Process]

Figure 13:
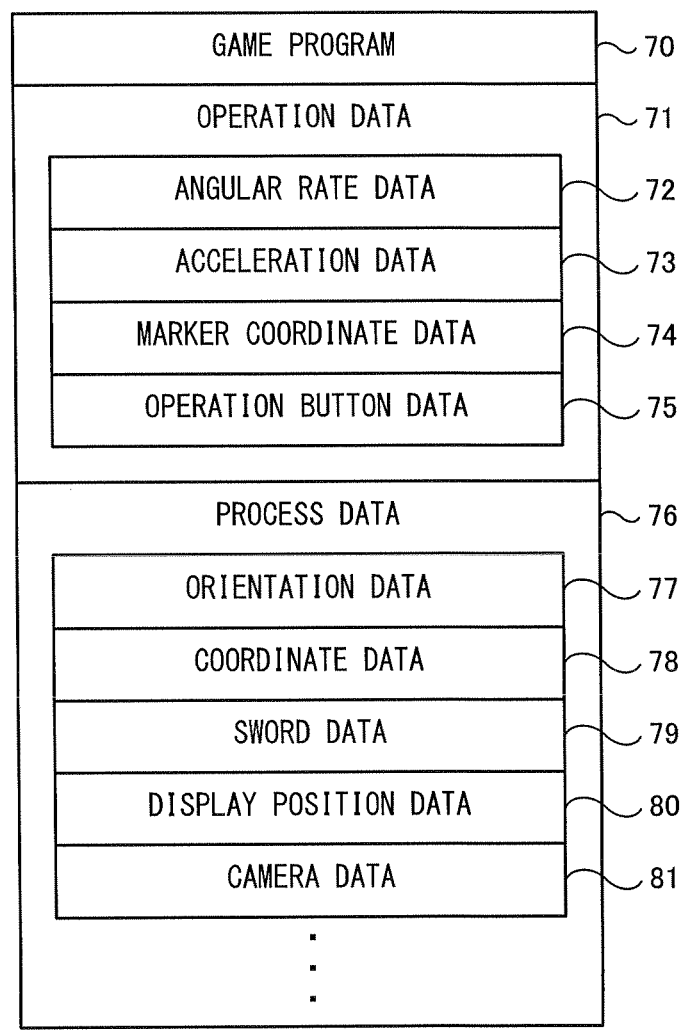
FIG. 13 is a diagram illustrating main data to be stored in a main memory of the game apparatus.

Next, the process performed by the game apparatus 3 will be described in detail. Firstly, main data used in the process performed by the game apparatus 3 will be described with reference to FIG. 13. FIG. 13 is a diagram illustrating main data to be stored in the main memory (the external main memory 12 or the internal main memory 11e) of the game apparatus 3. As shown in FIG. 13, a game program 70, operation data 71, and process data 76 are stored in the main memory of the game apparatus 3. In addition to the data shown in FIG. 13, data necessary for the game process, such as image data of various objects appearing in a game, data representing various parameters of the objects, and the like, are stored in the main memory.

Part or all of the game program 70 is read from the optical disc 4 and stored to the main memory at an appropriate time after the game apparatus 3 is powered on. The game program 70 includes a program for performing the process for calculating an orientation of the input device 8 based on the operation data 71 and also calculating the two-dimensional coordinate point based on the calculated orientation. The game program 70 also includes a program for performing a predetermined game process using the two-dimensional coordinate point as a game input.

The operation data 71 is operation data transmitted from the input device 8 to the game apparatus 3. As described above, the operation data is transmitted from the input device 8 to the game apparatus 3 at intervals of 1/200 seconds, and therefore the operation data 71 stored in the main memory is updated at the same intervals. Note that a predetermined number of pieces of the operation data are sequentially stored to the main memory from the latest piece (the last acquired piece).

Angular rate data 72 is data representing angular rates detected by the gyroscopes 55 and 56 of the gyroscope unit 7. Here, the angular rate data 72 represents the angular rates around three axes, that is, the X-axis, the Y-axis, and the Z-axis shown in FIG. 3.

Acceleration data 73 is data representing an acceleration (acceleration vector) detected by the acceleration sensor 37. Here, the acceleration data 73 represents a three-dimensional acceleration vector Va1 whose components are accelerations associated with the directions of three axes, that is, the X-axis, the Y-axis, and the Z-axis shown in FIG. 3. Further, in the present embodiment, a magnitude of the acceleration vector Va1 which is detected by the acceleration sensor 37 when the input device 8 is in static state is "1". That is, the magnitude of the gravitational acceleration detected by the acceleration sensor 37 is "1".

The marker coordinate data 74 represents a coordinate point calculated by the image processing circuit 41 of the imaging information calculation section 35, that is, the data represents the marker coordinate point. The marker coordinate point is expressed by a two-dimensional coordinate system (x'y'-coordinate system shown in FIG. 17) for representing, in the plane, a position corresponding to the pickup image. When an image including two markers 6R and 6L is taken by the image pickup element 40, two marker coordinate points are calculated. On the other hand, when either the marker 6R or the marker 6L is not positioned within a range in which the image pickup element 40 is allowed to take an image, the image pickup element 40 takes an image including only one marker, and only one marker coordinate point is calculated. Further, when neither the marker 6R nor the marker 6L is positioned within the range in which the image pickup element 40 is allowed to take an image, the image pickup element 40 does not take any image of the markers, so that no marker coordinate point is calculated. Therefore, the marker coordinate data 74 may represent two marker coordinate points, one marker coordinate point, or no marker coordinate point.

The operation button data 75 is data representing an input state of each of the operation buttons 32a to 32i.

The process data 76 is data used for a game process (FIG. 14) described below. The process data 76 includes orientation data 77, coordinate data 78, sword data 79, display position data 80, and camera data 81. The process data 76 includes various data (e.g., data representing a game parameter) used for the game process, in addition to the data shown in FIG. 13.

The orientation data 77 is data representing the orientation of the input device 8. The orientation data 77 is calculated based on the operation data 71. In the present embodiment, the orientation of the input device 8 is represented as a rotation matrix representing rotation from a predetermined orientation to the current orientation of the input device 8. However, in another embodiment, the orientation of the input device 8 may be represented using a third-order vector or three angles.

The coordinate data 78 is data representing the two-dimensional coordinate point. In the present embodiment, the coordinate data 78 is calculated based on the orientation data 77. In the present embodiment, the game apparatus 3 calculates the orientation data 77 using the angular rate data 72, and also calculates the two-dimensional coordinate point based on the orientation data 77, while in another embodiment, the two-dimensional coordinate point may be calculated directly from the angular rate data 72.

The sword data 79 is data representing the direction of the sword 62 being held by the player character 61. The sword data 79 is calculated based on the coordinate data 78. Note that in the case where the sword data 79 is calculated, the action of the player character 61 is controlled such that the direction of the sword 62 matches the direction indicated by the sword data 79.

The display position data 80 is data representing the position of the sight image 64 on the display screen. The display position data 80 is calculated based on the coordinate data 78, and represents a position on the display screen that corresponds to the position of the two-dimensional coordinate point within the virtual plane that is represented by the coordinate data 78.

The camera data 81 is data representing the position and the direction of the virtual camera within the virtual space. The virtual camera is intended to determine a viewpoint and a line-of-sight direction within the virtual space, and an image of the virtual space as viewed from the position of the virtual camera along the virtual camera direction is generated and displayed as a game image. In the present embodiment, when the player character 61 uses a bow and arrow, the virtual camera direction is controlled based on the display position data 80. Note that in other cases, the position and the direction of the virtual camera are controlled in accordance with, for example, the position and the direction of the player character 61.

Figure 14:
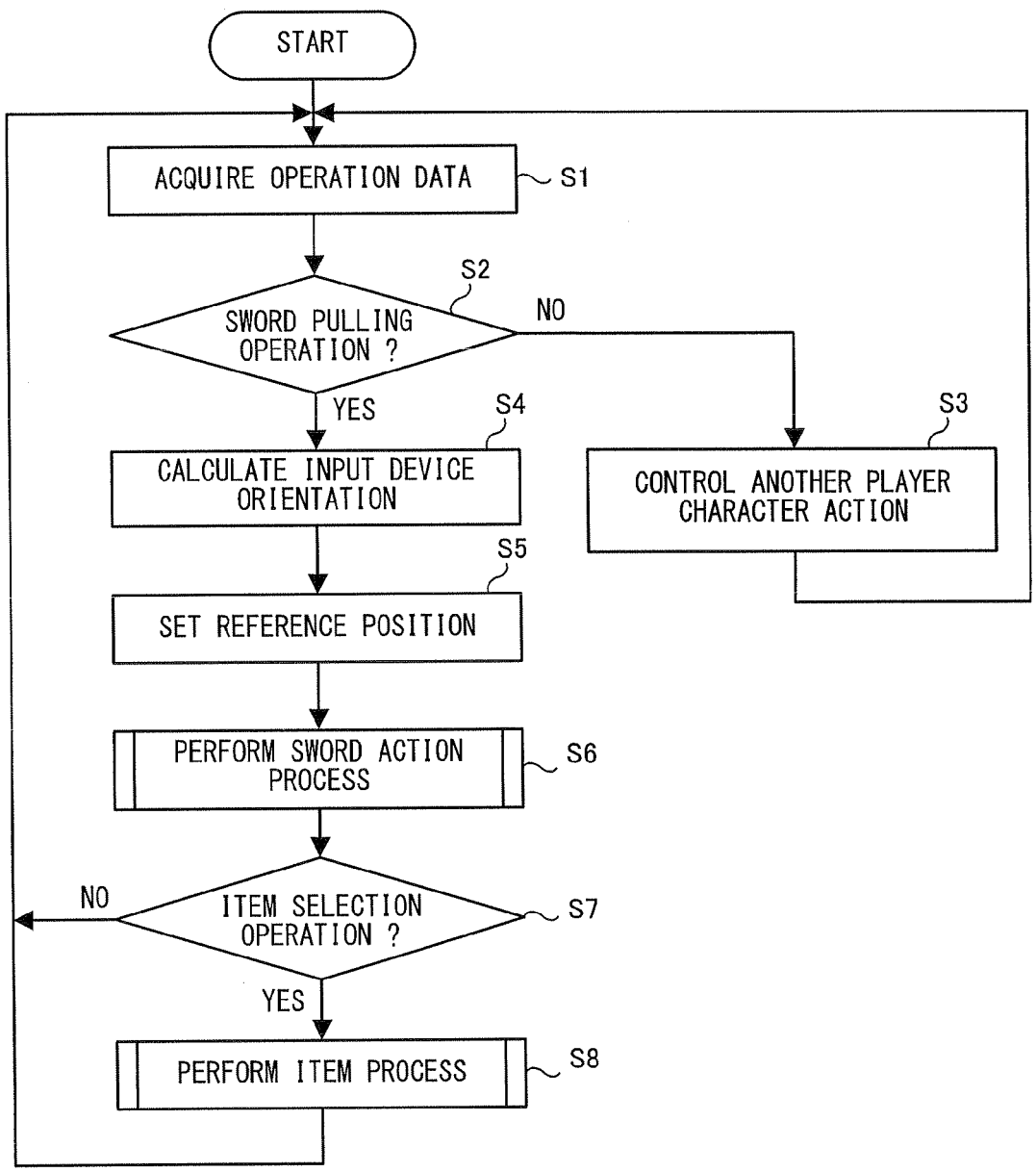
FIG. 14 is a main flow chart showing a flow of a process performed by the game apparatus.

Next, the process performed by the game apparatus 3 will be described in detail with reference to FIGS. 14 to 21. FIG. 14 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 14 illustrates a process performed when the processes described above are completed. Note that the flow charts shown in FIGS. 14 to 21 mainly describe calculation of the two-dimensional coordinate point and the game process based on the two-dimensional coordinate point, and some descriptions of other processes may be omitted for the purpose of facilitating easy understanding of the present invention. For example, processes for controlling actions of objects (e.g., enemy objects) other than the player character 61 and displaying a game image are appropriately performed at a rate of once per frame period, but the flow charts shown in FIGS. 14 to 21 omit the processes to some extent.

In step S1 shown in FIG. 14, the CPU 10 obtains the operation data. That is, the operation data transmitted from the input device 8 is received through the wireless controller module 19. The angular rate data, the acceleration data, the marker coordinate data, and the operation button data included in the received operation data are stored to the main memory. Following step S1, the process of step S2 is performed.

In step S2, the CPU 10 determines whether a sword pulling operation has been performed. The sword pulling operation is an operation for causing the player character 61 wearing the sword 62 to pull the sword 62. In the present embodiment, the sword pulling operation is an operation to swing the input device 8. The determination of step S2 is performed using the acceleration data 73 included in the operation data 71. Specifically, the CPU 10 uses the acceleration data 73 to determine whether an acceleration of a predetermined value or more has been applied to the input device 8. Then, when the acceleration of a predetermined value or more has been applied to the input device 8, a determination is made that the input device 8 has been swung, i.e., the sword pulling operation has been performed. Note that any operation may be employed as the sword pulling operation, e.g., the sword pulling operation may be an operation of pressing a predetermined button (e.g., the A button 32d) of the input device 8. When the determination result of step S2 is affirmative, the process of step S4 to be described later is performed. On the other hand, when the determination result of step S2 is negative, the process of step S3 is performed.

In step S3, the CPU 10 controls another action of the player character 61. Here, "such other action" refers to an action other than actions using items such as the sword 62 and a bow and arrow. In step S3, for example, the CPU 10 controls an action of the player character 61 moving within the virtual space. Then, an action of another object (e.g., an enemy object) is controlled, and a game image including the player character 61 is generated and displayed on the screen of the television 2. Following step S3, the process of step S1 is performed again.

On the other hand, in step S4, the CPU 10 calculates the orientation of the input device 8. Any method may be used to calculate the orientation in step S4. For example, the orientation calculation method may be a method using the angular rate data, the acceleration data, and the marker coordinate data (steps S22 to S24 to be described later) or a method using only one of the data. Following step S4, the process of step S5 is performed.

Figure 15:
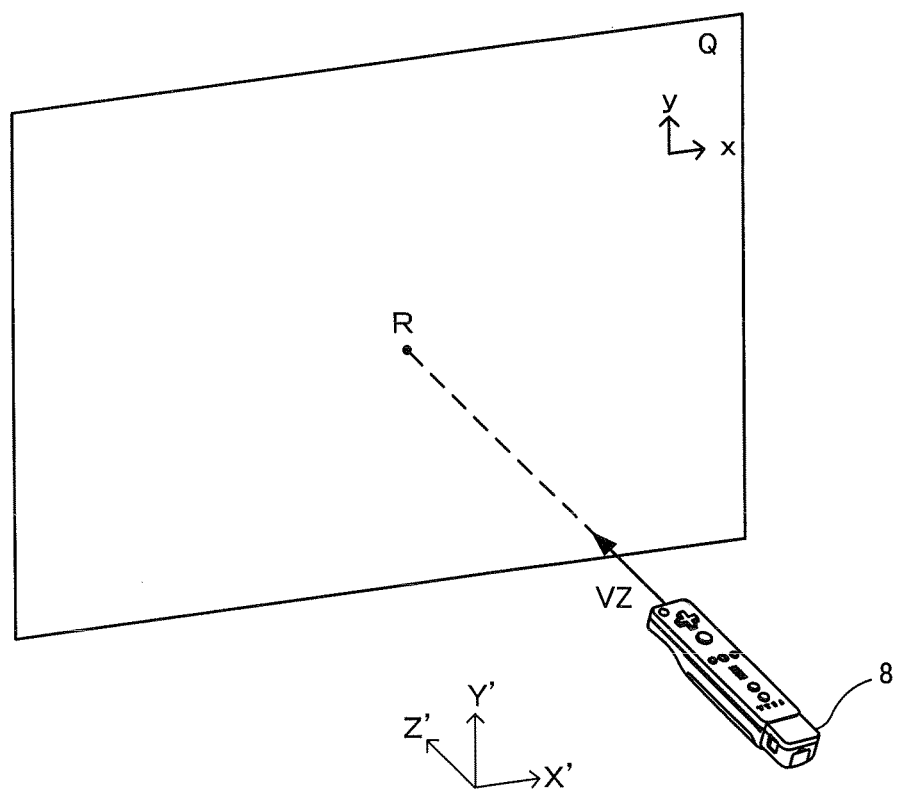
FIG. 15 is a diagram illustrating a virtual space for use in calculating a two-dimensional coordinate point.

In step S5, the CPU 10 sets the two-dimensional coordinate reference position. Here, in the present embodiment, the CPU 10 defines a three-dimensional virtual space (different from the game space), and calculates the two-dimensional coordinate point assuming that the input device 8 and a predetermined plane are virtually arranged. FIG. 15 is a diagram illustrating a virtual space for use in calculating the two-dimensional coordinate point. The CPU 10 calculates a two-dimensional coordinate point representing position R in plane Q specified by the direction of the Z-axis of the input device 8 (Z-axis vector VZ shown in FIG. 15) in the virtual space. Specifically calculated is a two-dimensional coordinate point in position R at the intersection between a line segment continuing from the Z-axis vector VZ in the virtual space, which represents the orientation of the input device 8, and the predetermined plane Q in the virtual space. Note that the "line segment continuing from the Z-axis vector VZ" is intended to mean a line segment passing in parallel to and along the Z-axis vector VZ. Here, a position within the virtual space is expressed by a coordinate system (X'Y'Z'-coordinate system) for representing the orientation of the input device 8. Accordingly, the orientation data 77 can be used without modification as data representing the orientation of the input device 8, which facilitates calculation in the virtual space.

As described above, in the present embodiment, position R in the predetermined plane Q is calculated as a two-dimensional coordinate point. Therefore, as the process of setting the reference position in step S5, the CPU 10 performs a process for setting position R corresponding to the current orientation of the input device 8 as the reference position (origin). Specifically, the CPU 10 sets an xy-coordinate system in plane Q such that position R corresponding to the orientation calculated in step S4 takes the origin. Data representing the xy-coordinate system set in step S5 (e.g., data specifying the position of the origin and the directions of the x- and y-axes) is stored to the main memory.

Although plane Q is set in an arbitrary manner, in the present embodiment, plane Q is set so as to perpendicularly cross the line segment continuing from the Z-axis vector VZ at a predetermined distance from the position of the input device 8 in the virtual space. Also, in another embodiment, the CPU 10 may predefine more than one plane within the virtual space, such that the xy-coordinate system is set in any one of the planes. For example, planes may be defined in four directions around the position of the input device 8 in the virtual space, such that the xy-coordinate system is set in one of the four planes. As a result, calculation in the xy-coordinate system can be facilitated by defining the four planes in parallel with either Y'Z'- or X'Y'-plane.

Figure 16:
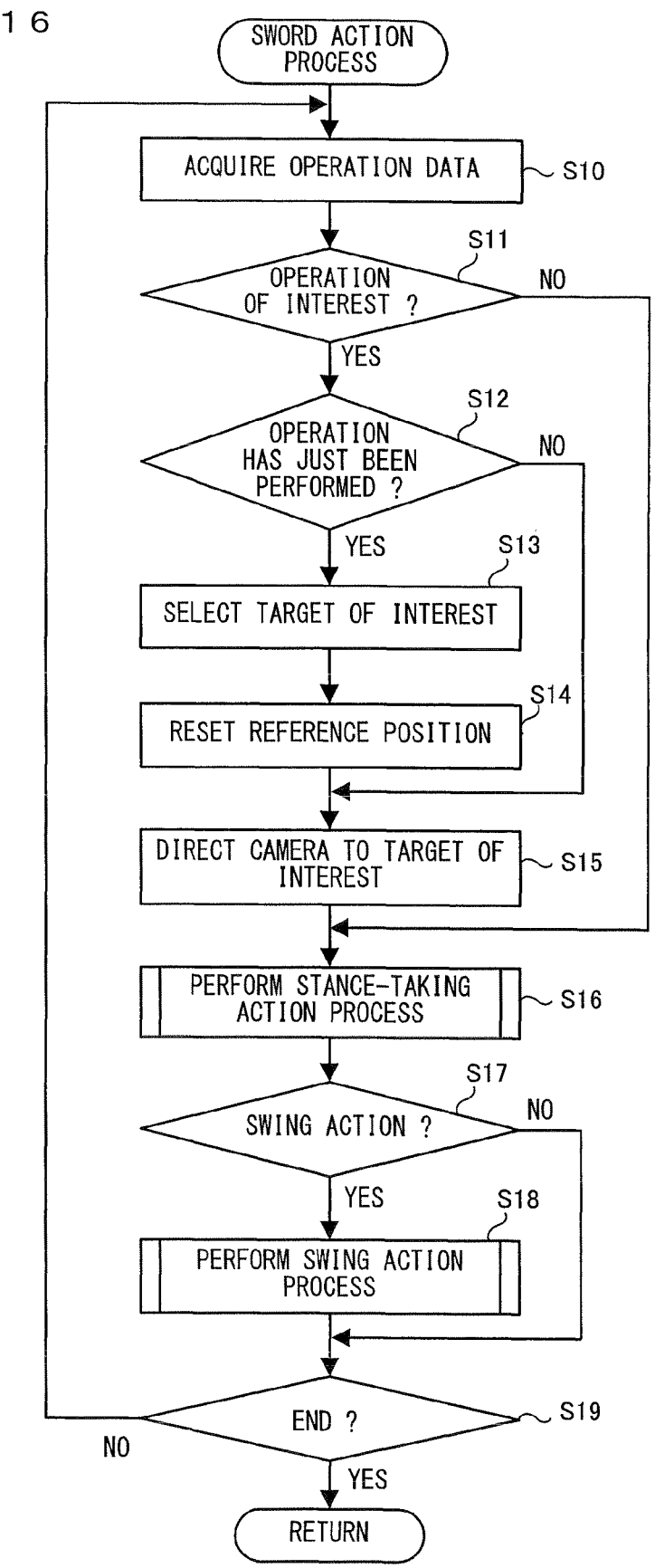
FIG. 16 is a flow chart showing a flow of a sword action process (step S4) shown in FIG. 14.

In step S6 following step S5, a sword action process (step S6) is performed. The sword action process is a process for causing the player character 61 to perform an action with the sword 62 in accordance with the player's operation. In this manner, in the present embodiment, the reference position is set at the start of the operation on the sword 62 since the sword action process starts immediately after the two-dimensional coordinate reference position is set in step S5. Referring to FIG. 16, the sword action process of step S6 will be described in detail below.

FIG. 16 is a flow chart showing a flow of the sword action process (step S4) shown in FIG. 14. Note that the process loop of steps S10 to S19 in the sword action process is performed at a rate of once per frame period, except when the process of step S18 to be described later is performed.

First, in step S10, the CPU 10 acquires operation data. The process of step S10 is the same as the aforementioned process of step S1. Following step S10, the process of step S11 is performed.

In step S11, the CPU 10 determines whether or not the operation of interest has been performed. The operation of interest is an operation to direct the virtual camera and the player character 61 toward a predetermined target of interest. Concretely, the operation of interest is an operation of pressing a predetermined button (e.g., "B" button 32i) of the input device 8. That is, the CPU 10 references operation button data 75 in the operation data 71 acquired in step S10 to determine whether or not the predetermined button for the operation of interest has been pressed. When the determination result of step S11 is affirmative, the process of step S12 is performed. On the other hand, when the determination result of step S11 is negative, the processes of steps S12 to S15 are skipped, and the process of step S16 is performed.

A process sequence of steps S12 to S15 is a procedure for directing the virtual camera and the player character 61 toward a predetermined target of interest. First, in step S12, the CPU 10 determines whether or not the operation of interest has just been performed (whether or not the predetermined button for the operation of interest has just been pressed). The determination of step S12 can be made by referencing operation data acquired one round before the operation data acquired in step S10. Specifically, when the operation data acquired one round before indicates that the predetermined button has not been pressed, a determination can be made that the operation of interest has just been performed. When the determination result of step S12 is affirmative, the process of step S13 is performed. On the other hand, when the determination result of step S12 is negative, the processes of steps S13 and S14 are skipped, and the process of step S15 is performed.

In step S13, the CPU 10 selects the predetermined target of interest from among objects arranged in the virtual space. While the target of interest to be selected may be determined by any method, examples of the object to be determined as the target of interest include an enemy object located close to the player character 61 and an object positioned close to the forward direction of the player character 61. Following step S13, the process of step S14 is performed.

In step S14, the CPU 10 sets the two-dimensional coordinate reference position again. The process of step S14 is the same as those in steps S4 and S5. Specifically, the CPU 10 calculates the current orientation of the input device 8, and sets the xy-coordinate system such that position R in plane Q that corresponds to the calculated orientation takes the origin. Data representing the xy-coordinate system being set is stored to the main memory. Following step S14, the process of step S15 is performed. In this manner, in the present embodiment, when the operation of interest is performed (Yes in step S12), step S14 is performed, allowing the player to reset the reference position by performing the operation of interest.

In step S15, the CPU 10 directs the virtual camera and the player character 61 toward the target of interest selected in step S13. Also, the virtual camera is positioned behind the player character 61 directed toward the target of interest. As a result, a game image including the target of interest as viewed from behind the player character 61 is displayed, allowing the player to readily see the target of interest. While the position of the virtual camera may be determined such that the player character 61 is positioned on a line from the virtual camera to the target of interest, it is preferably determined such that the player character 61 is positioned slightly off the line. The reason for this is that when the virtual camera is positioned directly behind the player character 61, the target of interest might be blocked by the player character 61 to become almost invisible. Also, in another embodiment, the CPU 10 may only direct the virtual camera toward the target of interest without changing the direction of the player character 61.

As described above, according to the processes of steps S11 to S15, when the operation of interest is performed, the virtual camera and the player character 61 are directed toward the target of interest, and therefore the player can have an easily viewable game image displayed with a simple operation. Also, the process of step S15 is performed during the operation of interest (while the predetermined button is being pressed), and therefore the player can keep the virtual camera and the player character 61 directed toward the target of interest by continuing the operation of interest. That is, while performing the operation of interest, the player can have the target of interest displayed on the screen.

Figure 17:
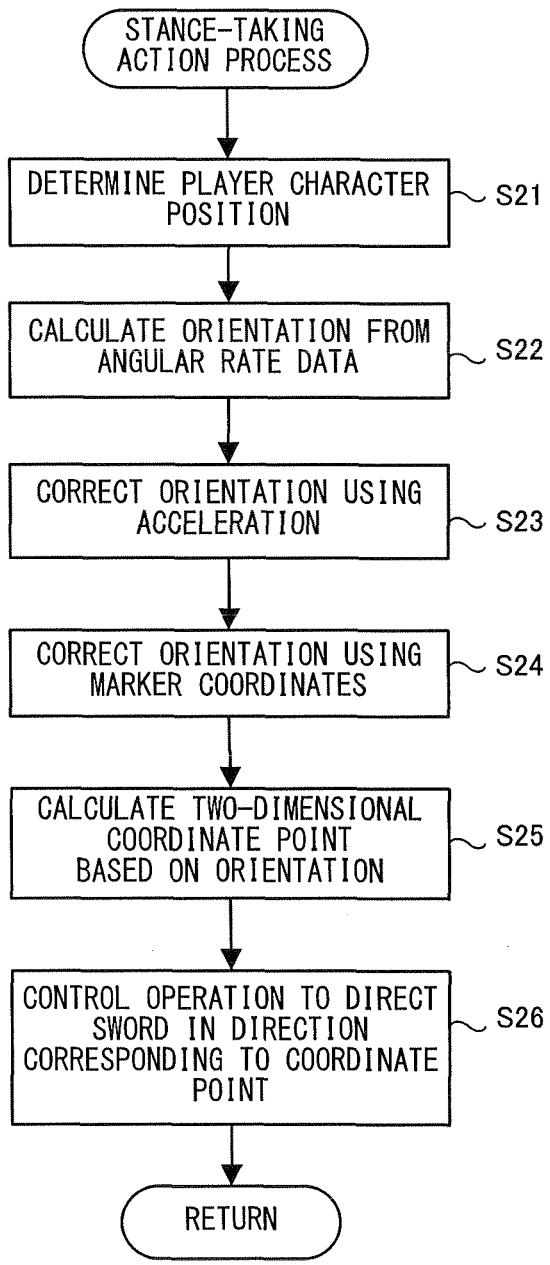
FIG. 17 is a flowchart showing a flow of a stance-taking action process (step S16) shown in FIG. 16.

In step S16, the CPU 10 performs a stance-taking action process. The stance-taking action process is a process for controlling the direction of the sword 62 held by the player character 61 in accordance with the player's operation. Referring to FIG. 17, the stance-taking action process of step S16 will be described in detail below.

FIG. 17 is a flow chart showing a flow of the stance-taking action process (step S16) shown in FIG. 16. In the stance-taking action process, first, in step S21, the CPU 10 determines the position of the player character 61 based on the player's operation. While the movement of the player character 61 may be controlled in any arbitrary manner, here, it is controlled in accordance with an input to the cross button 32a of the input device. Concretely, the CPU 10 identifies the pressed direction of the cross button 32a with reference to the operation button data 75 in the operation data 71, and moves the player character 61 toward a direction corresponding to the pressed direction. Data representing the post-movement position of the player character 61 is stored to the main memory. Following the process of step S21, the process of step S22 is performed.

The processes of steps S22 to S24 are processes for calculating the orientation of the input device 8 based on operation data. First, in step S22, the CPU 10 calculates the orientation of the input device 8 based on the angular rate data 72 stored in the main memory. While any method can be employed to calculate the orientation of the input device 8 from angular rates, in the present embodiment, the orientation is calculated using the previous orientation (the orientation calculated during the previous round) and current angular rates (angular rates acquired during the current process loop). Concretely, the CPU 10 calculates the orientation by rotating the previous orientation at the current angular rate for a unit period of time. Note that the previous orientation is specified by the orientation data 77 stored in the main memory, and the current angular rates are specified by the angular rate data 72 stored in the main memory. Data representing the orientation calculated in step S22 is stored to the main memory as new orientation data 77. Following step S22, the process of step S23 is performed.

Note that in the case of calculating an orientation from angular rates, it is necessary to know an initial orientation. Specifically, in the case where an orientation is calculated from angular rates (when the previous orientation has not been calculated), it is necessary to calculate an initial orientation. The initial orientation may be calculated based on acceleration data (see step S23 to be described later) or based on marker coordinate data (see step S24 to be described later). Also, the player may perform a predetermined operation with the input device 8 placed in a specific orientation and the specific orientation at the time of the predetermined operation may be used as the initial orientation.

In step S23, the CPU 10 corrects the orientation of the input device 8 using the acceleration data 73. Concretely, the CPU 10 initially calculates the orientation of the input device 8 based on the acceleration data 73. Here, when the input device 8 is almost in static state, the acceleration sensor 37 detects a gravitational acceleration applied to the input device 8, and therefore the CPU 10 can calculate the direction of the detected gravitational acceleration (the direction of gravity). Thus, under the situation where the acceleration sensor 37 detects the gravitational acceleration, the direction (orientation) of the input device relative to the direction of gravity can be calculated using the acceleration data 73.

Following the calculation of the orientation based on the acceleration data 73, the CPU 10 performs correction such that the orientation based on the angular rate data 72 approximates the orientation based on the acceleration data 73 at a given rate. The given rate may be a predetermined fixed value or may be set in accordance with, for example, an acceleration indicated by the acceleration data 73. Also, the orientation based on the acceleration data 73 cannot be calculated for a rotational direction about the direction of gravity, and therefore the CPU 10 may perform no correction on the rotational direction. Data representing the orientation corrected in step S23 is stored into the main memory as new orientation data 77. Following step S23, the process of step S24 is performed.

In step S24, the CPU 10 corrects the orientation of the input device 8 using the marker coordinate data 74. Concretely, the CPU 10 initially calculates the orientation of the input device 8 based on the marker coordinate data 74. Here, the marker coordinate data 74 indicates the positions of markers 6R and 6L within an image, and therefore based on the positions, the orientation of the input device 8 can be calculated for the roll direction (the rotational direction about the Z-axis). Specifically, the orientation of the input device 8 can be calculated for the roll direction based on the tile of a line extending between the positions of the markers 6R and 6L. Also, in the case where the position of the input device 8 relative to the marker portion 6 can be identified (e.g., in the case where the input device 8 can be assumed to be positioned in front of the marker portion 6), the orientation of the input device 8 can be calculated for the pitch and yaw directions based on the position of the marker portion 6 within the pickup image. For example, the orientation of the input device 8 can be calculated for the pitch and yaw directions based on a midpoint position between the positions of the markers 6R and 6L. Note that when no image of the marker portion 6 was taken by the image pickup element 40 of the input device 8, the orientation cannot be calculated based on the marker coordinate data 74, and therefore the process of step S24 may be skipped.

Following the calculation of the orientation based on the marker coordinate data 74, the CPU 10 performs correction such that the orientation corrected in step S23 approximates the orientation based on the marker coordinate data 74 at a given rate. The given rate may be a predetermined fixed value. Also, the correction in step S24 may be performed for one or two of the roll, pitch, and yaw directions. For example, when the marker coordinate data 74 is used, the orientation can be calculated for the roll direction with accuracy, and therefore the CPU 10 may perform the correction only for the roll direction using the orientation based on the marker coordinate data 74. Data representing the orientation corrected in step S24 is stored into the main memory as new orientation data 77. Following step S24, the process of step S25 is performed.

Through the aforementioned processes of steps S22 to S24, the orientation of the input device 8 is calculated. Here, in a method for calculating the orientation of the input device 8 using angular rates, the orientation can be calculated wherever the input device 8 is directed. On the other hand, the method using angular rates calculates the orientation by cumulatively adding angular rates which are successively detected, and therefore calculation accuracy might deteriorate due to, for example, accumulated error or gyroscope precision might deteriorate due to a so-called temperature drift problem. Also, the method using accelerations can calculate the orientation wherever the input device 8 is directed, but the orientation cannot be calculated with accuracy if the input device 8 is being moved vigorously (because the direction of gravity is not detectable). Also, the method using marker coordinates can correctly calculate the orientation (especially for the roll direction), but the orientation cannot be calculated depending on the direction of the input device 8 (because marker coordinates are not detected if the input device 8 is directed for image pickup but the marker portion 6 is not present in that direction). The present embodiment uses the three methods with different features as described above, and therefore the orientation of the input device 8 can be calculated with enhanced accuracy. While in the present embodiment, the game apparatus 3 uses the three methods to calculate the orientation of the input device 8, in another embodiment, one or two of the three methods may be used to calculate the orientation.

Figure 18:
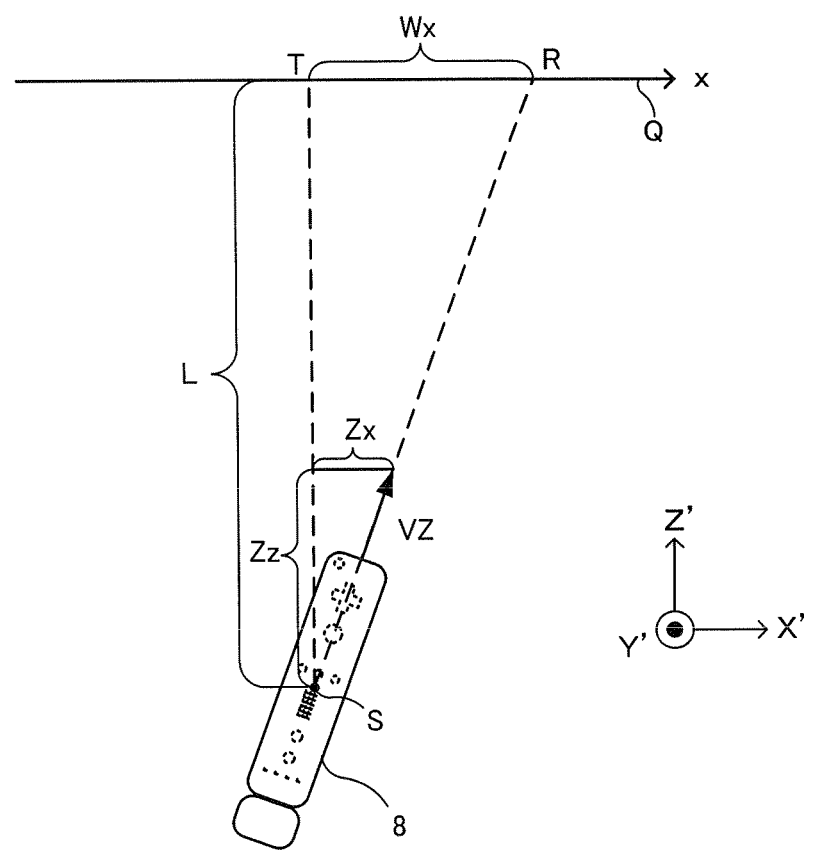
FIG. 18 is a diagram where the virtual space shown in FIG. 15 is viewed from the y-axis positive direction toward the negative direction.

In step S25, the CPU 10 calculates the two-dimensional coordinate point based on the orientation of the input device 8. As described above, the two-dimensional coordinate point is calculated as a coordinate point representing position R at the intersection between a line segment continuing from the Z-axis vector VZ of the input device 8 and the predetermined plane Q in a virtual space where the input device 8 is virtually disposed (see FIG. 15). Referring to FIG. 18, the method for calculating the two-dimensional coordinate point will be described in detail below.

FIG. 18 is a diagram where the virtual space shown in FIG. 15 is viewed from the y-axis positive direction toward the negative direction. In FIG. 18, the length from point S representing the position of the input device 8 to point (projected point) T to which point S is projected onto plane Q is "L". Also, the length from projected point T to intersection point R is "Wx" for the x-component. In the present embodiment, the value for length L is set by the player at a predetermined time (e.g., at the time of starting a game process). Data (referred to as "length data") indicating the value for length L set by the player is stored to the main memory.

The Z-axis vector VZ is determined by the orientation of the input device 8. Specifically, the components (Zx,Zy,Zz) of the Z-axis vector VZ constitute a part of the rotation matrix representing the orientation, and their values are already calculated. Also, as is apparent from FIG. 18, the ratio of length Wx to length L and the ratio of the x-component (Zx) of the Z-axis vector VZ to the z-component (Zz) of the Z-axis vector VZ are in a relationship to be equal to each other. Accordingly, based on this relationship, length Wx can be calculated from the calculated x- and z-components Zx and Zz of the vector VZ and known length L. Concretely, length Wx can be calculated by the following equation (1)

$$Wx = L \times Zx/Zz \quad (1)$$

Also, as in the case of length Wx for the x-component, length Wy from projected point T to intersection point R can be calculated for the y-component by the following equation (2)

$$Wy = L \times Zy/Zz \quad (2)$$

Once lengths Wx and Wy are obtained, a two-dimensional coordinate point representing the position of intersection point R within plane Q can be calculated. In the present embodiment, the xy-coordinate system within plane Q is set such that a line continued from the Z-axis vector of the input device 8 crosses the origin. Specifically, the position of projected point T takes the origin of the xy-coordinate system. Accordingly, the two-dimensional coordinates of intersection point R are (Wx,Wy).

To specifically describe the process of step S25, the CPU 10 initially reads the orientation data 77 and the length data from the main memory. Then, from the rotation matrix represented by the orientation data 77, the components Zx, Zy, and Zz of the Z-axis vector and length L indicated by the length data are substituted into equations (1) and (2), thereby calculating lengths Wx and Wy. As a result, two-dimensional coordinates (Wx,Wy) of intersection point R within plane Q are obtained. The CPU 10 stores data representing the two-dimensional coordinate point into the main memory as coordinate data 78. Following step S25, the process of step S26 is performed.

As described above in relation to step S25, in the present embodiment, to calculate a two-dimensional coordinate point corresponding to the orientation of the input device 8, the orientation of the input device 8 is calculated, and a position within the predetermined plane Q pointed at by the input device 8 in a virtual space is also calculated. Here, in another embodiment, the two-dimensional coordinate point may be calculated by any method so long as the two-dimensional coordinate point is calculated based on angular rates so as to change in accordance with the orientation of the input device 8. For example, the two-dimensional coordinate point may be calculated so as to change in accordance with angular rates indicated by the angular rate data. Concretely, the CPU 10 may set the two-dimensional coordinate point as the origin at the time of setting a reference position, and thereafter, the CPU 10 may sequentially calculate the two-dimensional coordinate point by moving the coordinate system in a direction corresponding to the direction of an acquired angular rate, by an amount of displacement corresponding to the magnitude of the angular rate.

Returning to the description of FIG. 17, in step S26, the CPU 10 controls the sword 62 to change the direction in accordance with the two-dimensional coordinate point. Specifically, the player character 61 is caused to perform an action of moving the sword 62 to a direction corresponding to the two-dimensional coordinate point. Concretely, the CPU 10 reads the coordinate data 78 from the main memory, and calculates the direction of the sword 62 based on the two-dimensional coordinate point indicated by the coordinate data 78. Here, the direction of the sword 62 relative to the forward direction of the player character 61 is calculated so as to correspond to the direction from the origin to the two-dimensional coordinate point. Also, the magnitude of a tilt of the sword 62 with respect to the forward direction is calculated so as to correspond to the distance from the origin to the two-dimensional coordinate point. Data indicating the direction of the calculated sword 62 is stored into the main memory as sword data 79. Note that in the process of generating and displaying a game image, the CPU 10 identifies the direction of the sword 62 with reference to the sword data 79, and causes the player character 61 to perform an action such that the direction of the sword 62 correspond to the direction indicated by the sword data 79. Then, a game image representing the virtual space including the player character 61 is generated and displayed on the screen. Following step S26, the CPU 10 ends the stance-taking action process shown in FIG. 17.

By step S26, the direction of the sword 62 is controlled to approximately correspond to the orientation of the input device 8. However, the direction of the sword 62 does not have to completely match the orientation of the input device 8. While the player can freely direct the input device 8, the direction in which the sword 62 is movable may be limited to such an extent that the action of the player character 61 does not become unnatural. For example, the configuration may be such that in the case where the two-dimensional coordinate point is at a predetermined distance or more away from the origin (in the case where the input device 8 is rotated by a predetermined angle or more from the reference orientation), the direction of the sword 62 does not change anymore than that.

Returning to the description of FIG. 16, in step S17 following step S16, the CPU 10 determines whether or not a swing action has been performed. The swing action is an action to instruct the player character 61 to swing the sword 62. In the present embodiment, the swing action is an action of swinging the input device 8. The determination as to whether or not the swing action has been performed may be made in any manner, and it may be made using the angular rate data 72 or the acceleration data 73 or using the orientation of the input device 8 calculated in steps S22 to S24. Specifically, the determination can be made by sequentially referencing a plurality of pieces of the angular rate data 72 from the latest piece and calculating the amount of rotation and the rotational direction of the input device 8 within a predetermined period of time. Also, as in the sword pulling operation (step S2), the determination can be made by determining whether or not an acceleration of a predetermined value or more has been applied to the input device 8, using the acceleration data 73. Also, the determination can be made by calculating variations among the orientations of the input device 8 calculated in steps S22 to S24. When the determination result of step S17 is affirmative, the process of step S18 is performed. On the other hand, when the determination of step S17 is negative, the process of step S18 is skipped and the process of step S19 is performed.

Figure 19:
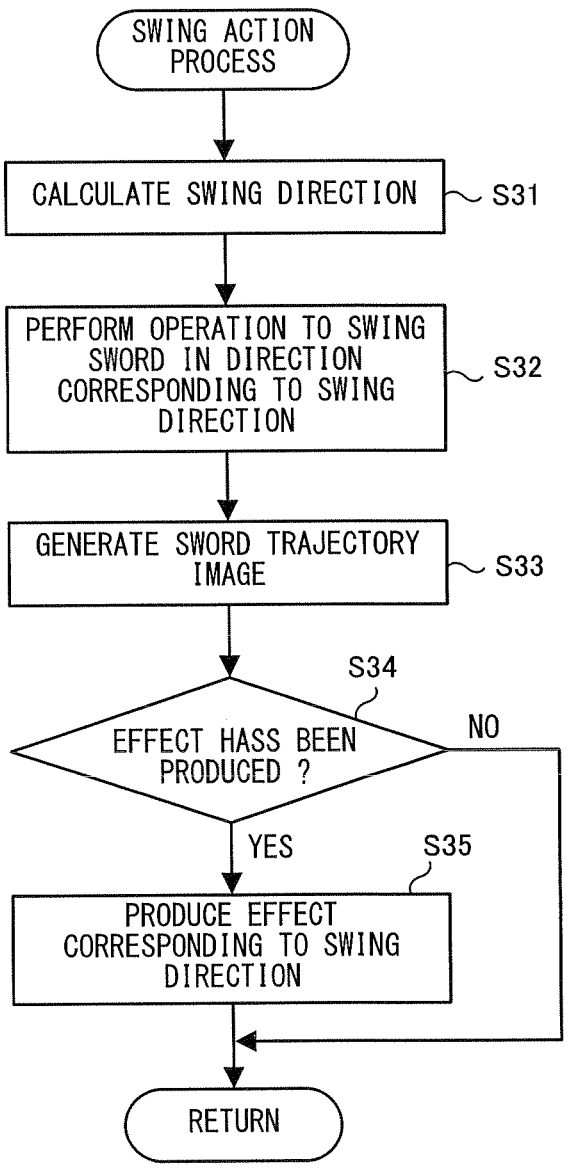
FIG. 19 is a flow chart showing a flow of a swing action process (step S18) shown in FIG. 16.

In step S18, the CPU 10 performs a swing action process. The swing action process is a process for causing the player character 61 to perform an action of swinging the sword 62. Referring to FIG. 19, the swing action process of step S18 will be described in detail below.

FIG. 19 is a flow chart showing a flow of the swing action process (step S18) shown in FIG. 16. In the swing action process, first, in step S31, the CPU 10 calculates the direction (swing direction) in which the input device 8 has been swung. Note that any method can be employed to calculate the swing direction. The CPU 10 may calculate the swing direction using the angular rate data 72 or the acceleration data 73 or using the orientation of the input device 8, as described above in relation to step S17. Following step S31, the process of step S32 is performed.

In step S32, the CPU 10 causes the player character 61 to perform an action of swinging the sword 62 in a direction corresponding to the swing direction. Specifically, the CPU 10 causes the player character 61 to perform an action of swinging the sword 62 in a direction in accordance with the swing direction of the input device 8 calculated in step S31. Note that a process in step S32 for generating and displaying game images representing the action of swinging the sword 62 may be performed over a plurality of frames. Also, in another embodiment, the action of swinging the sword 62 is not necessarily performed in the direction corresponding to the swing direction of the input device 8, and it may be an action of swinging the sword 62 in a predetermined specific direction. Following step S32, the process of step S33 is performed.

In step S33, the CPU 10 generates and displays an image of the trajectory of the sword 62. The purpose of this is to allow the player to readily perceive the direction in which the sword 62 was swung. Accordingly, the trajectory image of the sword 62 may be displayed slightly after the player character 61 has completely swung the sword 62. Following step S33, the process of step S34 is performed.

In step S34, the CPU 10 determines whether or not to produce an effect as a result of the sword 62 being swung. The effect as a result of the sword 62 being swung is an image representing, for example, an enemy object being cut or destroyed by the sword 62. The determination of step S34 is made by whether or not the sword 62 has touched another object. When the determination result of step S34 is affirmative, the process of step S35 is performed. On the other hand, when the determination result of step S34 is negative, the process of step S35 is skipped and the CPU 10 ends the swing action process.

In step S35, the CPU 10 generates and displays an effect in accordance with the swing direction of the sword 62. Specifically, different effects are generated and displayed depending on the swing direction of the sword 62. For example, the CPU 10 may generate and display an image representing an object being cut in a direction in accordance with the swing direction of the sword 62. At this time, it is not necessary for the swing direction of the sword 62 and the direction represented by the effect to strictly match each other. For example, for the purpose of simplifying the process, the CPU 10 may prepare a plurality of patterns of effects (e.g., effects corresponding to eight directions, i.e., vertical, horizontal, and diagonal directions) and display a pattern of effect in accordance with the swing direction of the sword 62. Also, the effect may be displayed only when the sword 62 is swung in a specific direction. For example, an enemy object for which attack is effective only when the sword 62 is swung in a specific direction may appear so that an effect (an effect representing that the attack has been delivered) is displayed only when the sword 62 is swung in that specific direction. Also, depending on the type of the object, the same effect may be displayed regardless of the swing direction. Following step S35, the CPU 10 ends the swing action process.

As described above, according to the swing action process, the player character 61 can be operated to swing the sword 62 in a direction in accordance with the swing direction of the input device 8. Also, different game effects are generated in accordance with the swing direction of the sword 62, further enhancing the enjoyment of the game.

Note that in the swing action process, the two-dimensional coordinate point is not used as a game input. That is, the determination as to the swing action of the input device 8 does not involve the two-dimensional coordinate point. Here, in another embodiment, the two-dimensional coordinate point may be used for determining the swing action of the input device 8. For example, the CPU 10 may determine whether or not the swing action has been performed in accordance with the amount of movement of the two-dimensional coordinate point, and calculate the swing direction based on the moving direction of the two-dimensional coordinate point.

Returning to the description of FIG. 16, in step S19 following step S18, the CPU 10 determines whether or not to end the sword action process. The determination of step S19 can be made based on whether an operation of sheathing the sword 62 has been performed (e.g., an operation of pressing a predetermined button of the input device 8), with reference to the operation button data 75 in the operation data 71. When the determination result of step S19 is negative, the process of step S10 is performed again. Thereafter, the processes of steps S10 to S19 are repeated until the sword action process is determined to end in step S19. On the other hand, when the determination result of step S19 is affirmative, the CPU 10 ends the sword action process.

According to the sword action process, a process for changing the direction of the sword 62 held by the player character 61 in accordance with the two-dimensional coordinate point is performed as a game process based on the two-dimensional coordinate point. At this time, a two-dimensional coordinate reference position is set in response to the sword pulling operation which is an operation to start the sword action process (step S5). Accordingly, the player can control the direction of the sword 62 using as a reference orientation the orientation of the input device 8 at the time of the sword pulling operation. Specifically, when operating the sword 62, the player can perform the sword pulling operation while freely directing the input device 8, and subsequent operations of the sword 62 can be also performed with the input device 8 being directed freely.

Also, according to the sword action process, when the operation of interest is performed (Yes in step S11), the reference position is set again (step S14). That is, the player can reset the reference position while operating the sword. Here, in the present embodiment, since the game operation can be performed while freely directing the input device 8, the orientation (reference orientation) of the input device 8 at the time of the player starting the sword operation might be lost during the sword operation. That is, it might be difficult for the player to return the sword 62 to its initial state (in which the sword faces forward from the player character 61). On the other hand, according to the present embodiment, it is possible for the player to readily return the sword 62 to its initial state by resetting the reference position during the sword action process.

Also, the operation of interest is an operation of directing the virtual camera and the player character 61 to a target of interest. When the virtual camera changes its direction, the direction of the sword 62 being displayed changes on the display, which changes the relationship between the direction of the sword being displayed and the orientation of the input device 8. As a result, the player might perceive the operation to be unnatural. On the other hand, according to the present embodiment, when the operation of interest is performed, the reference position is reset so that the sword 62 is returned to its initial state, and therefore the player can be prevented from perceiving the operation to be unnatural as described above.

Returning to the description of FIG. 14, in step S7 following the sword action process (step S6), the CPU 10 determines whether or not the item selection operation has been performed. The item selection operation is an operation for causing the player character 61 to use an item other than the sword 62. As will be described in detail later, when the item selection operation is performed, an item selection screen is displayed, and the player selects an item to be used by the player character 61 from the item selection screen. The item selection operation is an operation of pressing a predetermined button (e.g., a button 32b numbered "1") of the input device 8. As in step S1, the CPU 10 acquires operation data 71, and determines whether or not the predetermined button has been pressed for the item selection operation with reference to operation button data 75 in the operation data 71. When the determination result of step S7 is affirmative, the process of step S8 is performed. On the other hand, when the determination result of step S7 is negative, the process of step S1 is performed again.

Figure 20:
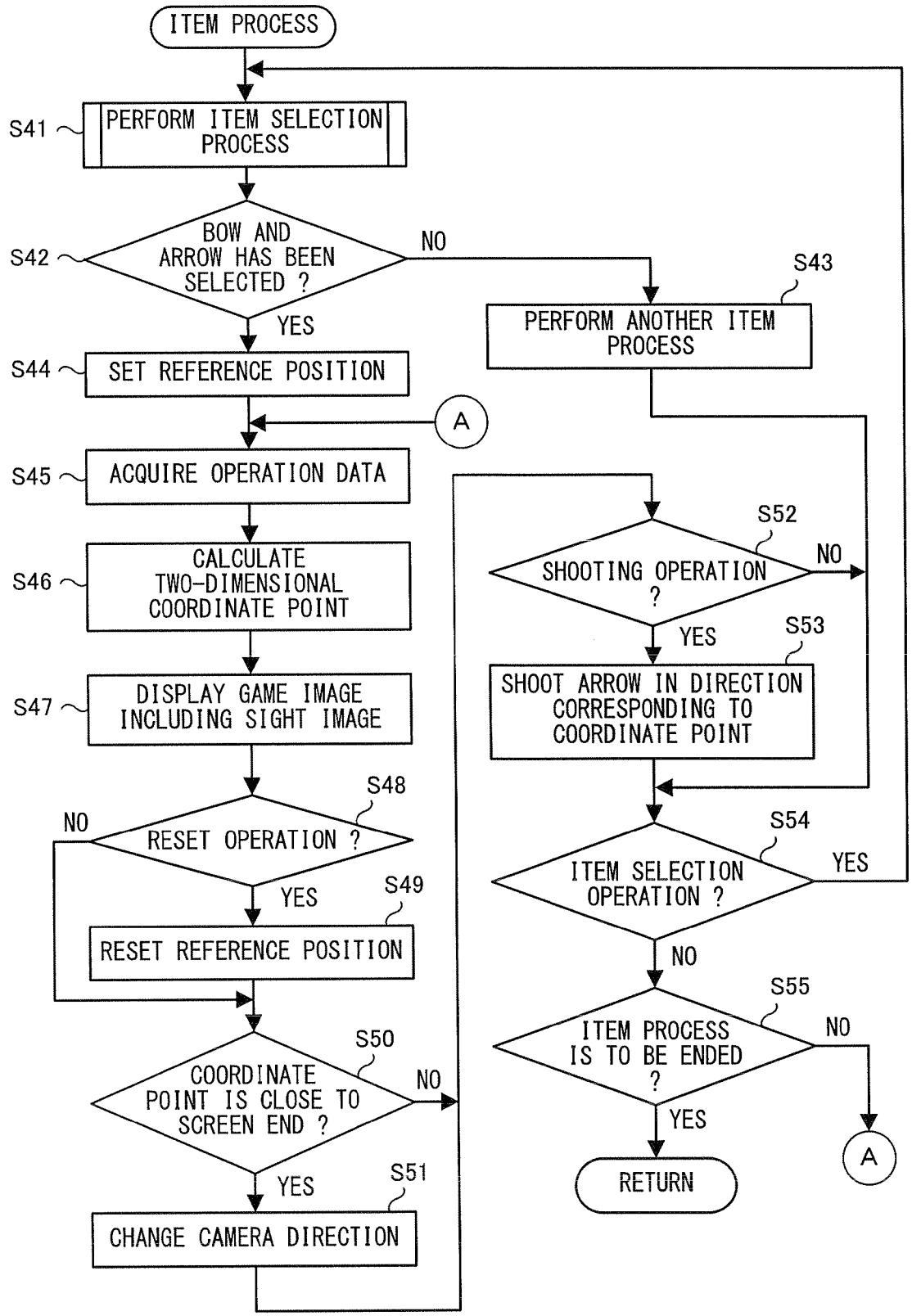
FIG. 20 is a flow chart showing a flow of an item process (step S8) shown in FIG. 14.

In step S8, the CPU 10 performs an item process. The item process is a process for causing the player character 61 to perform an action using an item other than the sword 62. Referring to FIG. 20, the item process of step S8 will be described in detail below.

Figure 21:
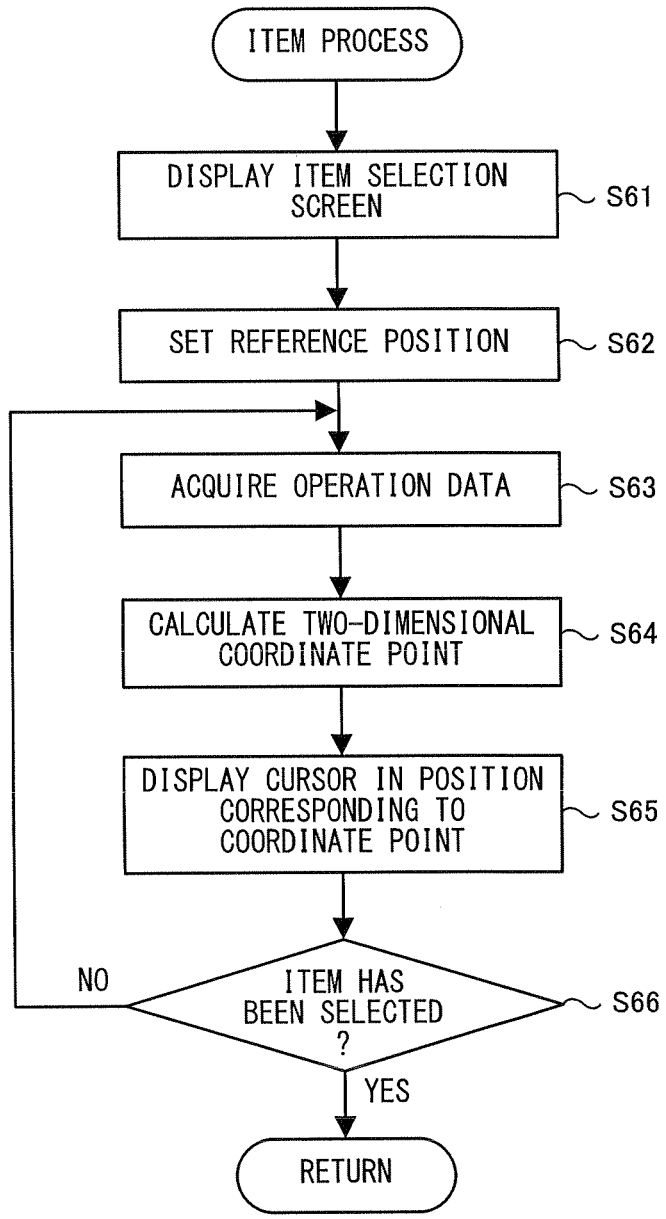
FIG. 21 is a flowchart showing a flow of an item selection process (step S41) shown in FIG. 20.

FIG. 20 is a flow chart showing a flow of the item process (step S8) shown in FIG. 14. In the item process, first in step S41, the CPU 10 performs an item selection process. The item selection process is a process for causing the player to select an item to be used by the player character 61. In the item selection process, one item is selected from among choices for the item to be used by the player character 61 in accordance with the two-dimensional coordinate point, and an item being selected at the time of the predetermined item selection operation is determined as the item to be used by the player character. Referring to FIG. 21, the item selection process of step S41 will be described in detail below.

FIG. 21 is a flow chart showing a flow of the item selection process (step S41) shown in FIG. 20. In the item selection process, first in step S61, the CPU 10 displays an item selection screen. For example, the item selection screen is a screen for displaying images (icons) representing items that can be used by the player character 61. Following step S61, the process of step S62 is performed.

In step S62, the CPU 10 sets the two-dimensional coordinate reference position. The process of step S62 is the same as those of steps S4 and S5. In this manner, in the present embodiment, the two-dimensional coordinate reference position is set at the start of the operation for selecting an item. Following step S62, the process of step S63 is performed.

In step S63, the CPU 10 acquires operation data. The process of step S63 is the same as that of step S1. Note that in the item selection process, the process loop of steps S63 to S66 is repeatedly performed at a rate of once per frame period. Following step S63, the process of step S64 is performed.

In step S64, the CPU 10 calculates the two-dimensional coordinate point. In step S64, the two-dimensional coordinate point is calculated in the same manner as in steps S22 to S25. Following step S64, the process of step S65 is performed.

In step S65, the CPU 10 displays a cursor in a position on the display screen that corresponds to the two-dimensional coordinate point calculated in step S64. The CPU 10 initially calculates the position of the cursor on the display screen based on the two-dimensional coordinate point. While the position of the cursor may be calculated in any manner so long as it is calculated based on the two-dimensional coordinate point, in the present embodiment, for example, the position of the cursor is calculated in the following manner. Specifically, the position of the cursor is set to the center of the screen when the two-dimensional coordinate point takes the origin. Also, when the two-dimensional coordinate point is a point other than the origin, the cursor position corresponding to the screen center is set in a direction corresponding to the direction of the two-dimensional coordinate point with respect to the origin and at a distance corresponding to the distance from the origin to the two-dimensional coordinate point. After calculating the cursor position, the CPU 10 displays the cursor in the calculated position on the item selection screen. As a result, the cursor to be operated by the player is displayed along with icon images representing items. Following step S65, the process of step S66 is performed.

In step S66, the CPU 10 determines whether or not any item has been selected. Specifically, the CPU 10 determines whether or not the item selection operation has been performed with the cursor pointing at an item icon image. The item selection operation is an operation for determining an item to be used by the player character 61, e.g., an operation of pressing a predetermined button of the input device. When the determination result of step S66 is affirmative, the CPU 10 ends the item selection process. In this case, an item pointed at by the cursor during the item selection operation is selected as the item to be used by the player character 61. On the other hand, the determination result of step S66 is negative, the process of step S63 is performed again. Thereafter, the process loop of steps S63 to S66 is repeated until any item is selected in step S66.

As described above in relation to the item selection process, in the present embodiment, the two-dimensional coordinate point is used in the operation for selecting/determining the item to be used by the player character 61. Also, the two-dimensional coordinate reference position is set at the start (step S62) of that item selection/determination operation, and therefore in this operation, as in the operation of the sword 62, a game operation can be performed while freely directing the input device 8 as desired.

Note that in another embodiment, the item selection process is not necessarily performed based on the two-dimensional coordinate point. For example, in step S65 of the item selection process, the CPU 10 may calculate the cursor position based on the orientation of the input device 8 calculated in steps S22 to S24, in place of the two-dimensional coordinate point.

Returning to the description of FIG. 20, when the item selection process (step S41) ends, the player character 61 is caused to perform an action using the item determined in step S66 in the processes of steps S42 to S55. In the present embodiment, the action of the player character 61 using a bow and arrow is assumed to be controlled based on the two-dimensional coordinate point, and the processes of steps S42 to S55 in FIG. 20 will be described mainly focusing on the case where a bow and arrow is used. In the processes of steps S42 to S55, a sight image 64 is displayed to indicate a position within a virtual space that corresponds to the two-dimensional coordinate point, and a game process is performed in which an arrow is shot in the direction indicated by the sight image 64 in accordance with a predetermined shooting operation on the input device 8.

In step S42, the CPU 10 determines whether or not a bow and arrow has been selected in the item selection process of step S41. When the determination result of step S42 is negative, the CPU 10 performs a process in step S43 for controlling the action of the player character 61 using an item other than a bow and arrow. Note that any item may be used and also any methods may be used to operate the item and control the action. For example, when the item is an item, such as a sling or a boomerang, which is intended to throw (or shoot) an object or intended to be thrown, the same operation method as that for a bow and arrow may be used for that item. That is, the bow-and-arrow operation method in the present embodiment can be used for items for throwing objects and items to be thrown. Following step S43, the process of step S54 to be described later is performed. On the other hand, when the determination result of step S42 is affirmative, the process of step S44 is performed.

The processes of steps S44 to S46 are the same as those of steps S62 to S64. That is, in step S44, the CPU 10 sets the two-dimensional coordinate reference position. Specifically, in the present embodiment, the two-dimensional coordinate reference position is set at the start of the operation using a bow and arrow. In step S45 following step S44, the CPU 10 acquires operation data. Note that in the present embodiment, except for the case where the process of step S53 is performed, the process loop of steps S45 to S55 are repeatedly performed at a rate of once per frame period until the operation using the bow and arrow ends. In step S46 following step S45, the CPU 10 calculates the two-dimensional coordinate point. Following step S46, the process of step S47 is performed.

In step S47, the CPU 10 displays the image of the virtual space (game space) on the screen of the television 2, along with the sight image 64. Here, the sight image 64 is displayed in a position corresponding to the two-dimensional coordinate point. Concretely, the process of step S47 is performed in the following manner.

The CPU 10 initially calculates the display position of the sight image 64 based on the two-dimensional coordinate point. The concrete method for calculating the display position may be the same as the method for calculating the cursor position (as described above in step S65). Data representing the position of the sight image 64 calculated in step S47 is stored to the main memory as display position data 80.

Next, the CPU 10 reads camera data 81 from the main memory, and generates an image of the virtual space as viewed in the direction of the virtual camera from the position of the virtual camera. Note that while operating the bow and arrow, a so-called first-person viewpoint game image (an image of the virtual space as viewed by the player character 61) as shown in FIG. 10 is displayed, and therefore the position of the virtual camera is determined based on the position of the player character 61. Also, the direction of the virtual camera is updated in step S51 to be described later.

Lastly, the CPU 10 reads display position data 80 from the main memory, and displays the sight image 64 in the position indicated by the display position data 80 on the image of the virtual space. Through the process of step S47, the sight image 64 to be controlled by the player is displayed with the image representing the virtual space. Following step S47, the process of step S48 is performed.

Note that in the present embodiment, it is assumed that the player scales up/down the game image while operating the bow and arrow, so that the position of the sight image 64 can be adjusted with higher precision. Accordingly, in the present embodiment, the CPU 10 displays the game image from the first-person viewpoint during the bow-and-arrow operation, while in another embodiment, a game image including the player character 61 as shown in FIG. 8 may be displayed during the bow-and-arrow operation.

In step S48, the CPU 10 determines whether or not a reset operation has been performed. The reset operation is an operation for setting again (resetting) the two-dimensional coordinate reference position during the bow-and-arrow operation. For example, the reset operation is an operation of pressing a predetermined button of the input device 8. Concretely, the CPU 10 determines whether or not the predetermined button has been pressed for the reset operation with reference to operation button data 75 in the operation data 71 acquired in step S45. When the determination result of step S48 is affirmative, the process of step S49 is performed. On the other hand, when the determination result of step S48 is negative, the process of step S49 is skipped, and the process of step S50 is performed.

In step S49, the CPU 10 sets the two-dimensional coordinate reference position again. The process of step S49 is the same as that of step S44 (and those of steps S4 and S5). Specifically, the CPU 10 calculates the current orientation of the input device 8, and sets the xy-coordinate system such that position R in plane Q that corresponds to the calculated orientation takes the origin. Data representing the xy-coordinate system being set is stored to the main memory. Following step S49, the process of step S50 is performed. In this manner, in the present embodiment, the player can reset the reference position during the bow-and-arrow operation through the reset operation.

In step S50, the CPU 10 determines whether or not the sight image 64 is positioned close to the edge of the screen. Concretely, the determination is made as to whether the sight image 64 is positioned within a predetermined distance from the edge of the screen (display area). Note that the position of the sight image 64 can be known by reading and referencing display position data 80 from the main memory. When the determination result of step S50 is affirmative, the process of step S51 is performed. On the other hand, when the determination result of step S50 is negative, the process of step S51 is skipped, and the process of step S52 is performed.

In step S51, the CPU 10 changes the direction of the virtual camera in accordance with the position of the sight image 64. In the present embodiment, when the sight image 64 is not positioned within the predetermined distance from the edge of the screen, the virtual camera does not move. Accordingly, when the sight image 64 is positioned at the screen center (when the two-dimensional coordinate point is set as the reference position) as shown in FIGS. 10 and 12, the virtual camera does not move. Also, when the sight image 64 is positioned within a predetermined distance from an end of the screen, the virtual camera is caused to move in a direction corresponding to the position of the sight image 64. Specifically, when the sight image 64 is positioned within a predetermined distance from the right end of the screen, the virtual camera is caused to turn to the right, and when the sight image 64 is positioned within a predetermined distance from the left end of the screen, the virtual camera is caused to turn to the left. Also, when the sight image 64 is positioned within a predetermined distance from the top end of the screen, the virtual camera is caused to turn to the top, and when the sight image 64 is positioned within a predetermined distance from the bottom end of the screen, the virtual camera is caused to turn to the bottom. Furthermore, in the present embodiment, the amount of movement (rotation) of the virtual camera increases as the sight image 64 approaches an end of the screen. That is, the CPU 10 moves the virtual camera in accordance with the degree of distance from the two-dimensional coordinate point to the reference position. Note that when the virtual camera is vertically rotated 180 degrees, the image displayed on the screen turns upside down, and therefore, for the vertical direction, the range of rotation of the virtual camera may be limited. For example, the virtual camera may only turn as far as it can look up or down directly above or below it.

The CPU 10 stores data indicating the direction (and position) of the virtual camera after movement (change) to the main memory as camera data 81. When generating an image within the virtual space in step S47, the camera data 81 is used to display the display target area within the display target area after scrolling. Note that the process of step S51 is performed every frame period, and therefore the player can keep turning the virtual camera to scroll the screen by positioning the sight image 64 close to an end of the screen. Also, any method can be employed to control the virtual camera based on the sight image 64, and in another embodiment, the position, rather than (or in addition to) the direction, of the virtual camera may be changed. Following step S51, the process of step S52 is performed.

In step S52, the CPU 10 determines whether or not a shooting operation has been performed. The shooting operation is an operation for causing the player character 61 to shoot an arrow. The shooting operation is performed by pressing a predetermined button (e.g., the "A" button 32d) of the input device 8. Specifically, the CPU 10 determines whether or not the predetermined button has been pressed for the operation of interest with reference to operation button data 75 in the operation data 71 acquired in step S10. When the determination result of step S52 is affirmative, the process of step S53 is performed. On the other hand, the determination result of step S52 is negative, the process of step S53 is skipped, and the process of step S54 is performed.

In step S53, the CPU 10 causes the player character 61 to perform an action of shooting an arrow in a direction indicated by the sight image 64. Specifically, when the shooting operation is performed, the CPU 10 performs a process for generating and displaying on the screen an image in which the arrow is flying in the direction indicated by the sight image 64. Note that this process may be performed over a plurality of frames. Also, the "direction indicated by the sight image 64" is a direction from the position of the virtual camera or the player character 61 toward a position within the virtual space that is indicated by the sight image 64. That is, in the present embodiment, the sight image 64 is intended to indicate an arrow shooting direction. However, in another embodiment, the sight image 64 may indicate a landing position. Following step S53, the process of step S54 is performed.

In step S54, the CPU 10 determines whether or not an item selection operation has been performed. The process of step S54 is the same as that of step S7. When the determination result of step S54 is affirmative, the process of step S41 is performed again. In this case, an item to be used by the player character 61 is selected again, and an action using the selected item is performed. On the other hand, the determination result of step S54 is negative, the process of step S55 is performed.

In step S55, the CPU 10 determines whether or not to end the action using the item. The determination of step S55 is made based on whether a predetermined operation (e.g., an operation of pressing the button 32c numbered "2") has been performed for ending the action using the item. When the determination of step S55 is negative, the process of step S45 is performed again. In this case, the bow-and-arrow operation is performed subsequently. On the other hand, when the determination result of step S55 is affirmative, the CPU 10 ends the item process.

Returning to the description of FIG. 14, after the item process (step S8) ends, the process of step S1 is performed again. Thereafter, the processes of steps S1 to S8 are repeatedly performed until the game ends. Note that the CPU 10 ends the game, for example, when the game has been cleared, the game is over, or the player has given an instruction to stop the game. This is the end of the description of the game process shown in FIG. 14.

As described above, according to the present embodiment, when the player inputs a predetermined instruction (Yes in step S2, S7, S11, S48 or S66), a two-dimensional coordinate reference position is set (step S5, S62, S14, S49 or S44). Thereafter, a two-dimensional coordinate point is calculated based on angular rate data to represent a position relative to a reference position (S25, S46, S64). Then, a game process is performed using the calculated two-dimensional coordinate point as a game input (S26, S47, S65).

According to the foregoing, the two-dimensional coordinate point reflects an orientation relative to a reference orientation which is the orientation of the input device 8 when the predetermined instruction is input. In addition, since the two-dimensional coordinate point is used as a game input, the player can perform a game operation by changing the orientation of the input device 8 relative to the reference orientation. Also, according to the foregoing, the reference position is set when the player inputs a predetermined instruction. Specifically, the player can set the reference position at his/her own convenience, and therefore can freely set the reference orientation. Therefore, according to the present embodiment, the player can perform a game operation for changing the orientation of the input device 8 relative to the reference orientation which can be freely set.

Thus, according to the present embodiment, the player can readily perform a game operation while freely directing the input device 8.

[Variants]

(Variant on the Game Process)

The foregoing embodiment has been described with respect to exemplary game processes based on the two-dimensional coordinate point, including the process for controlling the direction of a predetermined object (sword 62) (step S26), the process for controlling the position of the sight image to shoot an arrow in the direction indicated by the sight image (steps S47 and S53), and the process for controlling the cursor position to select an item pointed at by the cursor (steps S65 and S66). Here, in another embodiment, any processes, not limited to the aforementioned three processes, can be based on the two-dimensional coordinate point. For example, the game apparatus may perform a game process in which a moving direction of an object is determined based on the two-dimensional coordinate point or a game process in which the position of the cursor is controlled based on the two-dimensional coordinate point to process an object pointed at by the cursor.

(Variant Concerning the Timing of Setting the Reference Position)

The foregoing embodiment has been described with respect to the two cases where the reference position is set: (a) at the start of a game process based on the two-dimensional coordinate point (steps S5, S44 and S62); and (b) during the game process based on the two-dimensional coordinate point (steps S14 and S49). Here, in another embodiment, the reference position may be set any time so long as the setting is made in response to an instruction inputted by the player. Specifically, the reference position may be set at a different time from when a game process based on the two-dimensional coordinate point is started, and the operation for setting the reference position may be different from the operation for starting that game process.

(Variant Concerning Information Used as the Game Input)

The foregoing embodiment has been described with respect to the example where a two-dimensional coordinate point having a value corresponding to the orientation of the input device 8 is used as a game input. Here, in another embodiment, the game apparatus may uses the orientation of the input device 8 as a game input. Specifically, when the player inputs a predetermined instruction, the game apparatus 3 may use as a game input an orientational change relative to a reference orientation which is the orientation of the input device 8 calculated based on operation data (angular rate data) acquired upon the input of the instruction. For example, in the case of the game process shown in FIG. 14, in step S5, the CPU 10 may set the orientation calculated in step S4 as the reference orientation. Then, in step S26, the operation of directing the sword 62 may be controlled based on the amount and/or direction of change of the orientation calculated in steps S22 to S24 relative from the reference orientation.

(Variant with a Networked Game System)

The foregoing embodiment has been described with respect to the example where a single game apparatus performs a procedure from acquisition of angular rate data until the process based on the two-dimensional coordinate point. Here, in another embodiment, the procedure may be performed in a game system including a plurality of information processing apparatuses. Specifically, the present invention may be embodied as a game system including a plurality of information processing apparatuses. For example, the present invention is applicable to a game system including a terminal device and a server device. Concretely, the terminal device includes a gyroscope and transmits angular rate data to the server device via a network. The server device calculates a two-dimensional coordinate point based on the received angular rate data, performs a game process based on the two-dimensional coordinate point, and transmits the game process result to the terminal device. The terminal device generates and display on the screen a game image based on the game process result. This game system can similarly achieve the effect of the foregoing embodiment. Also, in this game system, a server system may be composed of a plurality of information processing apparatuses capable of communicating with each other via a network, so that the information processing apparatuses share a series of processes.

As described above, the present invention is applicable to, for example, game apparatuses and programs with a view to allow the player to readily perform a game operation while freely directing an input device.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a game program executable by a computer processor of a game apparatus, the program including instructions causing the computer processor to perform operations providing functionality comprising:
 operation data acquisition for acquiring operation data from an input device at least including a gyroscope, wherein the operation data includes at least angular rate data;
 reference setting for setting a predetermined reference position in a predetermined virtual plane upon detecting a predetermined input from the input device, the predetermined virtual plane being arranged in a virtual space relative to the input device at a predetermined distance from the input device such that a line segment continuing from a pointing direction of the input device in the virtual space is perpendicular to the predetermined virtual plane;
 coordinate calculation for calculating a two-dimensional coordinate point within the predetermined virtual plane and indicative of an orientation of the input device based on the angular rate data, wherein the two-dimensional coordinate point represents a position relative to the reference position in the predetermined virtual plane at an intersection of a line segment from the input device along a pointing direction of the input device in the virtual space; and
 performing a game process based on calculated coordinate values of the two-dimensional coordinate point.

2. The storage medium according to claim 1, wherein the game process causes a predetermined object to perform a predetermined action toward a position within a virtual space that corresponds to the coordinate point or causes a predetermined process on an object in the position within the virtual space that corresponds to the coordinate point.

3. The storage medium according to claim 2, wherein the game process displays a predetermined image specifying the position within the virtual space that corresponds to the coordinate point and performs the game process in response to a first predetermined operation performed on the input device.

4. The storage medium according to claim 2, wherein the reference setting updates the reference position when a second predetermined operation is performed on the input device.

5. The storage medium according to claim 4, wherein,
 the second predetermined operation determines an item to be used by a predetermined object, and the game process includes causing the predetermined object to perform an action using the determined item.

6. The storage medium according to claim 5, wherein the game program further causes the computer processor to perform functionality as an item selector for selecting an item from among choices for items to be used by the predetermined object in accordance with the orientation of the input device or the coordinate point calculated based on the angular rate data, and for determining an item being selected at the time of the second predetermined operation as the item to be used by the predetermined object.

7. The storage medium according to claim 1, wherein, the game program further causes the computer processor to perform functionality as a virtual camera controller for controlling a position and/or a direction of a virtual camera based on the coordinate point, and wherein the virtual camera controller at least stops the virtual camera from moving when the coordinate point represents the reference position.

8. The storage medium according to claim 7, wherein the virtual camera controller moves the virtual camera in accordance with a degree of distance from the coordinate point to the reference position.

9. The storage medium according to claim 1, wherein, the game program further causes the computer processor to perform functionality as a virtual camera controller for controlling a position and/or a direction of a virtual camera such that the virtual camera is directed toward a predetermined target within a virtual space when a third predetermined operation is performed on the input device, and the reference setting updates the reference position when the third predetermined operation is performed.

10. The storage medium according to claim 9, wherein the game process controls an action of an object to be operated by a player of a game so that a direction of the object is changed in accordance with the coordinate point.

11. The storage medium according to claim 10, wherein the game process starts controlling the action of the object to be operated by the player in response to an input of a predetermined instruction.

12. The storage medium according to claim 1, wherein the coordinate calculation calculates the coordinate point so as to change in accordance with an angular rate indicated by the angular rate data.

13. The storage medium according to claim 1, wherein, the game program further causes the computer processor to perform an orientation calculation for determining an orientation of the input device based on the angular rate data, and wherein the coordinate calculation calculates the coordinate point based on the orientation of the input device.

14. The storage medium according to claim 13, wherein the coordinate calculation calculates a coordinate point representing a position at an intersection point in the predetermined virtual plane by a line segment continuing from a predetermined reference point in the virtual space in a pointing direction of a vector indicating the orientation of the input device.

15. The storage medium according to claim 13, wherein, the input device further includes an acceleration sensor, and the orientation calculation determines the orientation of the input device based on the angular rate data and corrects the orientation based on an acceleration detected by the acceleration sensor.

16. The storage medium according to claim 14, wherein, the input device further includes an image pickup portion, and the orientation calculation calculates the orientation of the input device based on the angular rate data and corrects the orientation at least for rotation about a direction of gravity based on a position of a predetermined target within an image taken by the image pickup portion.

17. A non-transitory computer-readable storage medium having stored therein a game program executable by a computer of a game apparatus, the program causing the computer to perform operations, comprising:
acquiring operation data from an input device at least including a gyroscope, wherein the operation data includes at least angular rate data;
detecting a predetermined input from the input device;
setting a reference orientation of the input device based on angular rate data acquired upon detecting the predetermined input from the input device and also setting a predetermined two-dimensional coordinate on a predetermined virtual plane set within a virtual space with respect to the input device upon detecting the predetermined input from the input device as a reference position representing the reference orientation of the input device;
calculating a second two-dimensional coordinate value based on angular rate data acquired after detecting the predetermined input from the input device and determining a second orientation of the input device based upon the second two-dimensional value; and
performing a game process based on a tilt of the second orientation with respect to the reference orientation.

18. A game apparatus comprising:
an operation data acquirer configured to acquire operation data from an input device at least including a gyroscope, wherein the operation data includes at least angular rate data from the gyroscope;
a reference setter configured to set a reference position in a predetermined virtual plane upon detecting a predetermined input from the input device, the predetermined virtual plane being arranged in a virtual space relative to the input device at a predetermined distance from the input device such that a line segment continuing from a pointing direction of the input device in the virtual space is perpendicular to the predetermined virtual plane;
a coordinate calculator configured to calculate a two-dimensional coordinate point within the predetermined virtual plane and indicative of an orientation of the input device based on the angular rate data, wherein the two-dimensional coordinate point represents a position relative to the reference position in the predetermined virtual plane at an intersection of a line segment from the input device along a pointing direction of the input device in the virtual space; and
a game process processor configured to perform a game process based on calculated coordinate values of the two-dimensional coordinate point.

19. A game apparatus comprising:
an operation data acquirer configured to acquire operation data from an input device at least including a gyroscope, wherein the operation data includes at least angular rate data;
detecting a predetermined input from the input device;
a reference orientation setter configured to set a reference orientation of the input device based on angular rate data acquired upon detecting the predetermined input from the input device and also setting a predetermined two-dimensional coordinate on a predetermined virtual plane set within a virtual space with respect to the input device upon detecting the predetermined input from the input device as a reference position representing the reference orientation of the input device;

an orientation determiner configured to calculate a second two-dimensional coordinate value based on angular rate data acquired after detecting the predetermined input from the input device and determining a second orientation of the input device based upon the second two-dimensional value; and a game process processor configured to perform a game process based on a tilt of the second orientation with respect to the reference orientation.

20. A game system provided with one or more intercommunicable information processing apparatuses, the system comprising:

an operation data acquisition portion configured to acquire operation data from an input device at least including a gyroscope, wherein the operation data includes at least angular rate data from the gyroscope;

a reference setting portion configured to set a reference position in a predetermined virtual plane upon detecting a predetermined input from the input device, the predetermined virtual plane being arranged in a virtual space relative to the input device at a predetermined distance from the input device such that a line segment continuing from a pointing direction of the input device in the virtual space is perpendicular to the predetermined virtual plane;

a coordinate calculation portion configured to calculate a two-dimensional coordinate point within the predetermined virtual plane and indicative of an orientation of the input device based on the angular rate data, wherein the two-dimensional coordinate point represents a position relative to the reference position in the predetermined virtual plane at an intersection of a line segment from the input device along a pointing direction of the input device in the virtual space; and a game process portion configured to perform a game process based on calculated coordinate values of the two-dimensional coordinate point.

21. A game system provided with one or more intercommunicable information processing apparatuses, the system comprising:

an operation data acquisition portion configured to acquire operation data from an input device at least including a gyroscope, wherein the operation data includes at least angular rate data;

detecting a predetermined input from the input device;

a reference orientation setting portion configured to set a reference orientation of the input device based on angular rate data acquired upon detecting the predetermined input from the input device and also setting a predetermined two-dimensional coordinate on a predetermined virtual plane set within a virtual space with respect to the input device upon detecting the predetermined input from the input device as a reference position representing the reference orientation of the input device;

an orientation determining portion configured to calculate a second two-dimensional coordinate value based on angular rate data acquired after detecting the predetermined input from the input device and determining a second orientation of the input device based upon the second two-dimensional value; and a game process portion configured to perform a game process based on a tilt of the second orientation with respect to the reference orientation.

22. A game process method to be executed by one or more intercommunicable information processing apparatuses, the method comprising:

acquiring operation data from an input device at least including a gyroscope, wherein the operation data includes at least angular rate data;

setting, using one or more of said intercommunicable information processing apparatuses, a predetermined reference position in a predetermined virtual plane upon detecting a predetermined input from the input device, the predetermined virtual plane being arranged in a virtual space relative to the input device at a predetermined distance from the input device such that a line segment continuing from a pointing direction of the input device in the virtual space is perpendicular to the predetermined virtual plane;

calculating, using one or more of said intercommunicable information processing apparatuses, a two-dimensional coordinate point within the predetermined virtual plane and indicative of an orientation of the input device based on the angular rate data, wherein the two-dimensional coordinate point represents a position relative to the reference position in the predetermined virtual plane at an intersection of a line segment from the input device along a pointing direction of the input device in the virtual space; and performing, using one or more of said intercommunicable information processing apparatuses, a game process based on calculated coordinate values of the two-dimensional coordinate point.

23. A game process method to be executed by one or more intercommunicable information processing apparatuses, the method comprising:

acquiring operation data from an input device at least including a gyroscope, wherein the operation data includes at least angular rate data;

detecting a predetermined input from the input device;

setting, using one or more of said intercommunicable information processing apparatuses, a reference orientation of the input device based on angular rate data acquired upon detecting the predetermined input from the input device and also setting a predetermined two-dimensional coordinate on a predetermined virtual plane set within a virtual space with respect to the input device upon detecting the predetermined input from the input device as a reference position representing the reference orientation of the input device;

calculating, using one or more of said intercommunicable information processing apparatuses, a second two-dimensional coordinate value based on angular rate data acquired after detecting the predetermined input from the input device and determining a second orientation of the input device based upon the second two-dimensional value; and performing, using one or more of said intercommunicable information processing apparatuses, a game process based on a tilt of the second orientation with respect to the reference orientation.

24. A game apparatus comprising:
a processing system, including one or more computer processor, the processing system configured to:
- acquire operation data from an input device at least including a gyroscope, wherein the operation data at least contains angular rate data from the gyroscope;
- set a predetermined reference position in a predetermined virtual plane upon detecting a predetermined input, the predetermined virtual plane being arranged in a virtual space relative to the input device at a predetermined distance from the input device such that a line segment continuing from a pointing direction of the input device in the virtual space is perpendicular to the predetermined virtual plane;
- calculate a two-dimensional coordinate point within the predetermined virtual plane and indicative of an orientation of the input device based on the angular rate data, wherein the two-dimensional coordinate point represents a position relative to the reference position in the predetermined virtual plane at an intersection of a line segment from the input device along a pointing direction of the input device in the virtual space; and
- perform a game process based on calculated coordinate values of the two-dimensional coordinate point.

25. A game apparatus comprising:
a processing system, including one or more computer processor, the processing system configured to:
- acquire operation data from an input device at least including a gyroscope, wherein the operation data at least includes angular rate data;
- detect a predetermined input from the input device;
- set a reference orientation of the input device based on angular rate data acquired upon detecting the predetermined input and also set a predetermined two-dimensional coordinate on a predetermined virtual plane set within a virtual space with respect to the input device upon detecting the predetermined input from the input device as a reference position representing the reference orientation of the input device;
- calculate a second two-dimensional coordinate value based on angular rate data acquired after detecting the predetermined input from the input device and determining a second orientation of the input device based upon the second two-dimensional value; and
- perform a game process based on a tilt of the second orientation with respect to the reference orientation.

* * * * *